United States Patent
Smith et al.

(10) Patent No.: US 9,993,110 B2
(45) Date of Patent: Jun. 12, 2018

(54) HEATING APPLIANCE

(71) Applicant: Spectrum Brands, Inc., Middleton, WI (US)

(72) Inventors: Jacob Daniel Smith, Madison, WI (US); Kroy Everett Nernberger, Madison, WI (US); Casey Aaron Klock, Verona, WI (US); James Raymond Patullo, Middleton, WI (US); Joseph Valdon Krebs, Madison, WI (US); David W. Everett, Jr., Verona, WI (US); Milan Poidl, Surfside, FL (US)

(73) Assignee: Spectrum Brands, Inc., Middleton, WI (US)

( * ) Notice: Subject to any disclaimer, the term of this patent is extended or adjusted under 35 U.S.C. 154(b) by 760 days.

(21) Appl. No.: 13/856,699

(22) Filed: Apr. 4, 2013

(65) Prior Publication Data
US 2014/0021192 A1    Jan. 23, 2014

Related U.S. Application Data

(60) Provisional application No. 61/620,103, filed on Apr. 4, 2012.

(51) Int. Cl.
A47J 37/07        (2006.01)
A47J 37/00        (2006.01)
(Continued)

(52) U.S. Cl.
CPC ....... *A47J 37/0635* (2013.01); *A47J 37/0611* (2013.01); *A47J 37/0652* (2013.01);
(Continued)

(58) Field of Classification Search
CPC ................ A47J 37/0786; A47J 37/0635; A47J 37/0682; A47J 37/0807; F24C 15/22; F24C 7/04
(Continued)

(56) References Cited

U.S. PATENT DOCUMENTS 3,593,647 A * 7/1971 Copeland, Jr. ...... A47J 37/0713
                                                    126/41 R
4,761,529 A * 8/1988 Tsisios ................ A47J 37/0635
                                                    126/21 A
(Continued)

FOREIGN PATENT DOCUMENTS

EP        0251539 A1    1/1988
EP        1598598 A1    11/2005
(Continued)

OTHER PUBLICATIONS

Extended European Search Report, Application No. 13162365.4-1656 to Rovcal, Inc., dated Sep. 17, 2013, 6 pages.

*Primary Examiner* — Dana Ross
*Assistant Examiner* — Lawrence Samuels
(74) *Attorney, Agent, or Firm* — Kagan Binder, PLLC

(57) ABSTRACT

A heating appliance generally includes a housing defining a food product compartment, and a rack configured to support a food product within the food product compartment. The heating appliance further includes a heating assembly disposed within the food product compartment. The heating assembly includes a heating element having a length, wherein the heating element is configured to have a temperature increase along the length during heating. The heating assembly further includes a heat distribution member disposed between the heating element and the rack, wherein the heat distribution member includes a pattern of
(Continued)

apertures that tapers in accordance with the temperature increase of the heating element.

10 Claims, 25 Drawing Sheets

(51) Int. Cl.
    *A47J 36/00*     (2006.01)
    *F24C 15/16*     (2006.01)
    *A47J 37/06*     (2006.01)
    *F24C 1/10*     (2006.01)
    *F24C 7/04*     (2006.01)
    *A47J 37/08*     (2006.01)

(52) U.S. Cl.
    CPC ............ *A47J 37/0807* (2013.01); *F24C 1/10* (2013.01); *F24C 7/04* (2013.01)

(58) Field of Classification Search
    USPC .......... 99/447, 399, 401, 445, 446; 219/405, 219/399, 411
    See application file for complete search history.

(56) References Cited

U.S. PATENT DOCUMENTS

| 5,617,778 | A | * | 4/1997 | Schroeter | A47J 37/0713 126/25 R |
|---|---|---|---|---|---|
| 5,782,230 | A | * | 7/1998 | Linnebur | A47J 37/0713 126/38 |
| 5,806,412 | A | * | 9/1998 | Bedford | A47J 37/0682 126/376.1 |
| 6,176,173 | B1 | * | 1/2001 | Holbrook | A47J 37/0682 126/41 R |
| 7,312,423 | B2 | * | 12/2007 | Idomoto | F24C 15/22 219/402 |
| 2006/0070615 | A1 | * | 4/2006 | Idomoto | F24C 15/22 126/273.5 |
| 2010/0006561 | A1 | * | 1/2010 | Hensel | A47J 37/0635 219/483 |

FOREIGN PATENT DOCUMENTS

| JP | 63185011 U | 11/1988 |
|---|---|---|
| WO | 96039070 A1 | 12/1996 |

* cited by examiner

| Length | Energy Output | Open Area/ Total Area Ratio | Energy to Food Product | |
|---|---|---|---|---|
| | | | | ⎫—981 |
| 0 | 1.48013644 | 0.147179431 | 0.13102 | |
| 0.1 | 1.578977962 | 0.147179431 | 0.13102 | |
| 0.2 | 1.675862552 | 0.147179431 | 0.13102 | |
| 0.3 | 1.76906586 | 0.147179431 | 0.13102 | |
| 0.4 | 1.857241469 | 0.147179431 | 0.13102 | |
| 0.5 | 1.939492229 | 0.147179431 | 0.13102 | |
| 0.6 | 2.01535668 | 0.147179431 | 0.13102 | |
| 0.7 | 2.084738246 | 0.147179431 | 0.13102 | |
| 0.8 | 2.147810362 | 0.147179431 | 0.13102 | |
| 0.9 | 2.204923168 | 0.147179431 | 0.13102 | |
| 1 | 2.256525838 | 0.147179431 | 0.13102 | |
| 1.1 | 2.303108941 | 0.147179431 | 0.13102 | |
| 1.2 | 2.345165526 | 0.147179431 | 0.13102 | |
| 1.3 | 2.38316716 | 0.147179431 | 0.13102 | |
| 1.4 | 2.417550827 | 0.147179431 | 0.13102 | |
| 1.5 | 2.448713111 | 0.147179431 | 0.13102 | |
| 1.6 | 2.47700898 | 0.147179431 | 0.13102 | |
| 1.7 | 2.502753263 | 0.147179431 | 0.13102 | |
| 1.8 | 2.526223558 | 0.147179431 | 0.13102 | |
| 1.9 | 2.547663775 | 0.147179431 | 0.13102 | |
| 2 | 2.567287823 | 0.08134077 | 0.085005 | |
| 2.1 | 2.585283178 | 0.08134077 | 0.085005 | |
| 2.2 | 2.601814179 | 0.08134077 | 0.085005 | |
| 2.3 | 2.617025008 | 0.08134077 | 0.085005 | |
| 2.4 | 2.631042316 | 0.08134077 | 0.085005 | |
| 2.5 | 2.643977532 | 0.08134077 | 0.085005 | |
| 2.6 | 2.655928861 | 0.08134077 | 0.085005 | |
| 2.7 | 2.666983016 | 0.08134077 | 0.085005 | |
| 2.8 | 2.677216713 | 0.08134077 | 0.085005 | |
| 2.9 | 2.686697947 | 0.08134077 | 0.085005 | |
| 3 | 2.695487105 | 0.08134077 | 0.085005 | |
| 3.1 | 2.703637906 | 0.08134077 | 0.085005 | |
| 3.2 | 2.711198227 | 0.08134077 | 0.085005 | |
| 3.3 | 2.718210798 | 0.08134077 | 0.085005 | |
| 3.4 | 2.724713816 | 0.047932613 | 0.052148 | |
| 3.5 | 2.730741462 | 0.047932613 | 0.052148 | |
| 3.6 | 2.736324361 | 0.047932613 | 0.052148 | |
| 3.7 | 2.741489969 | 0.047932613 | 0.052148 | |
| 3.8 | 2.746262915 | 0.047932613 | 0.052148 | |
| 3.9 | 2.750665296 | 0.047932613 | 0.052148 | |
| 4 | 2.754716936 | 0.047932613 | 0.052148 | |
| 4.1 | 2.758435604 | 0.047932613 | 0.052148 | |
| 4.2 | 2.761837215 | 0.047932613 | 0.052148 | |
| 4.3 | 2.764935994 | 0.047932613 | 0.052148 | |
| 4.4 | 2.767744624 | 0.047932613 | 0.052148 | |
| 4.5 | 2.770274379 | 0.047932613 | 0.052148 | |
| 4.6 | 2.772535228 | 0.047932613 | 0.052148 | |
| 4.7 | 2.774535935 | 0.047932613 | 0.052148 | |
| 4.8 | 2.776284141 | 0.047932613 | 0.052148 | |
| 4.9 | 2.777786436 | 0.047932613 | 0.052148 | |

FIG. 22A

| Length | Energy Output | Open Area/ Total Area Ratio | Energy to Food Product |
|---|---|---|---|
| 5 | 2.779048416 | 0.047932613 | 0.052148 |
| 5.1 | 2.780074737 | 0.047932613 | 0.052148 |
| 5.2 | 2.780869154 | 0.047932613 | 0.052148 |
| 5.3 | 2.781434554 | 0.047932613 | 0.052148 |
| 5.4 | 2.78177298 | 0.047932613 | 0.052148 |
| 5.5 | 2.781885654 | 0.047932613 | 0.052148 |
| 5.6 | 2.78177298 | 0.047932613 | 0.052148 |
| 5.7 | 2.781434554 | 0.047932613 | 0.052148 |
| 5.8 | 2.780869154 | 0.047932613 | 0.052148 |
| 5.9 | 2.780074737 | 0.047932613 | 0.052148 |
| 6 | 2.779048416 | 0.047932613 | 0.052148 |
| 6.1 | 2.777786436 | 0.047932613 | 0.052148 |
| 6.2 | 2.776284141 | 0.047932613 | 0.052148 |
| 6.3 | 2.774535935 | 0.047932613 | 0.052148 |
| 6.4 | 2.772535228 | 0.047932613 | 0.052148 |
| 6.5 | 2.770274379 | 0.047932613 | 0.052148 |
| 6.6 | 2.767744624 | 0.047932613 | 0.052148 |
| 6.7 | 2.764935994 | 0.047932613 | 0.052148 |
| 6.8 | 2.761837215 | 0.047932613 | 0.052148 |
| 6.9 | 2.758435604 | 0.047932613 | 0.052148 |
| 7 | 2.754716936 | 0.047932613 | 0.052148 |
| 7.1 | 2.750665296 | 0.047932613 | 0.052148 |
| 7.2 | 2.746262915 | 0.047932613 | 0.052148 |
| 7.3 | 2.741489969 | 0.047932613 | 0.052148 |
| 7.4 | 2.736324361 | 0.047932613 | 0.052148 |
| 7.5 | 2.730741462 | 0.047932613 | 0.052148 |
| 7.6 | 2.724713816 | 0.047932613 | 0.052148 |
| 7.7 | 2.718210798 | 0.08134077 | 0.088494 |
| 7.8 | 2.711198227 | 0.08134077 | 0.085005 |
| 7.9 | 2.703637906 | 0.08134077 | 0.085005 |
| 8 | 2.695487105 | 0.08134077 | 0.085005 |
| 8.1 | 2.686697947 | 0.08134077 | 0.085005 |
| 8.2 | 2.677216713 | 0.08134077 | 0.085005 |
| 8.3 | 2.666983016 | 0.08134077 | 0.085005 |
| 8.4 | 2.655928861 | 0.08134077 | 0.085005 |
| 8.5 | 2.643977532 | 0.08134077 | 0.085005 |
| 8.6 | 2.631042316 | 0.08134077 | 0.085005 |
| 8.7 | 2.617025008 | 0.08134077 | 0.085005 |
| 8.8 | 2.601814179 | 0.08134077 | 0.085005 |
| 8.9 | 2.585283178 | 0.08134077 | 0.085005 |
| 9 | 2.567287823 | 0.08134077 | 0.085005 |
| 9.1 | 2.547663775 | 0.147179431 | 0.13102 |
| 9.2 | 2.526223558 | 0.147179431 | 0.13102 |
| 9.3 | 2.502753263 | 0.147179431 | 0.13102 |
| 9.4 | 2.47700898 | 0.147179431 | 0.13102 |
| 9.5 | 2.448713111 | 0.147179431 | 0.13102 |
| 9.6 | 2.417550827 | 0.147179431 | 0.13102 |
| 9.7 | 2.38316716 | 0.147179431 | 0.13102 |
| 9.8 | 2.345165526 | 0.147179431 | 0.13102 |
| 9.9 | 2.303108941 | 0.147179431 | 0.13102 |

FIG. 22B

| Length | Energy Output | Open Area/ Total Area Ratio | Energy to Food Product |
|---|---|---|---|
| 10 | 2.256525838 | 0.147179431 | 0.13102 |
| 10.1 | 2.204923168 | 0.147179431 | 0.13102 |
| 10.2 | 2.147810362 | 0.147179431 | 0.13102 |
| 10.3 | 2.084738246 | 0.147179431 | 0.13102 |
| 10.4 | 2.01535668 | 0.147179431 | 0.13102 |
| 10.5 | 1.939492229 | 0.147179431 | 0.13102 |
| 10.6 | 1.857241469 | 0.147179431 | 0.13102 |
| 10.7 | 1.76906586 | 0.147179431 | 0.13102 |
| 10.8 | 1.675862552 | 0.147179431 | 0.13102 |
| 10.9 | 1.578977962 | 0.147179431 | 0.13102 |
| 11 | 1.48013644 | 0.147179431 | 0.13102 |

HEATING APPLIANCE

CROSS-REFERENCE TO RELATED APPLICATIONS

This application claims the benefit of U.S. Provisional Application No. 61/620,103 filed Apr. 4, 2012, which is incorporated herein in its entirety.

BACKGROUND

The present invention relates generally to appliances and, more particularly, to an appliance for heating a food product.

Many conventional heating appliances such as toaster ovens have a heating device and a food rack mounted within a housing for heating a food product (e.g., bread) placed on the rack using the heating device. A door provides access to the interior of the appliance for placing the food product on the rack, and a user interface provides control over the heat emitted by the heating device (e.g., control over the temperature and duration of heating).

In at least some heating appliances, a heat distribution member may be situated between the heating device and the rack to facilitate evenly distributing heat incidence over the food product. However, in many of these heating appliances, the distribution members do not achieve the desired results. There is a need, therefore, for a heating appliance that is configured to more evenly distribute heat incidence over the food product.

SUMMARY

In one embodiment, a heating appliance generally comprises a housing defining a food product compartment, and a rack configured to support a food product within the food product compartment. The heating appliance further comprises a heating assembly disposed within the food product compartment. The heating assembly comprises a heating element having a length, wherein the heating element is configured to have a temperature increase along the length during heating. The heating assembly further comprises a heat distribution member disposed between the heating element and the rack, wherein the heat distribution member comprises a pattern of apertures that tapers in accordance with the temperature increase of the heating element.

In another embodiment, a heat distribution member for a heating appliance is generally provided. The heating appliance has a heating element disposed within a food product compartment, and the heating element is configured to have a temperature that varies along its length during heating. The heat distribution member is configured to at least partially cover the heating element and comprises a first end, a second end, a center between the first end and the second end, and a pattern of apertures that tapers toward the center in accordance with the variation in temperature along the heating element.

In yet another embodiment, a heating appliance generally comprises a housing defining a food product compartment, a rack configured to support a food product within the food product compartment, and a heating assembly disposed within the food product compartment. The heating assembly comprises a heating element having a first end, a second end, and center between the first end and the second end. The heating element is configured to have a temperature that varies between the first end and the second end such that the temperature increases from the first end toward the center and increases from the second end toward the center during heating such that the heating element is hottest near the center. The heating assembly further comprises a heat distribution member disposed between the heating element and the rack, wherein the heat distribution member comprises a first end, a second end, a center between the first and second ends of the heat distribution member, and a pattern of apertures that tapers from the first end of the heat distribution member toward the center of the heat distribution member and tapers from the second end of the heat distribution member toward the center of the heat distribution member in accordance with the temperature increases of the heating element. The pattern comprises a first plurality of distinct groups of apertures disposed between the first end of the heat distribution member and the center of the heat distribution member that substantially mirrors a second plurality of distinct groups of apertures between the second end of the heat distribution member and the center of the heat distribution member.

BRIEF DESCRIPTION

Figure 10:
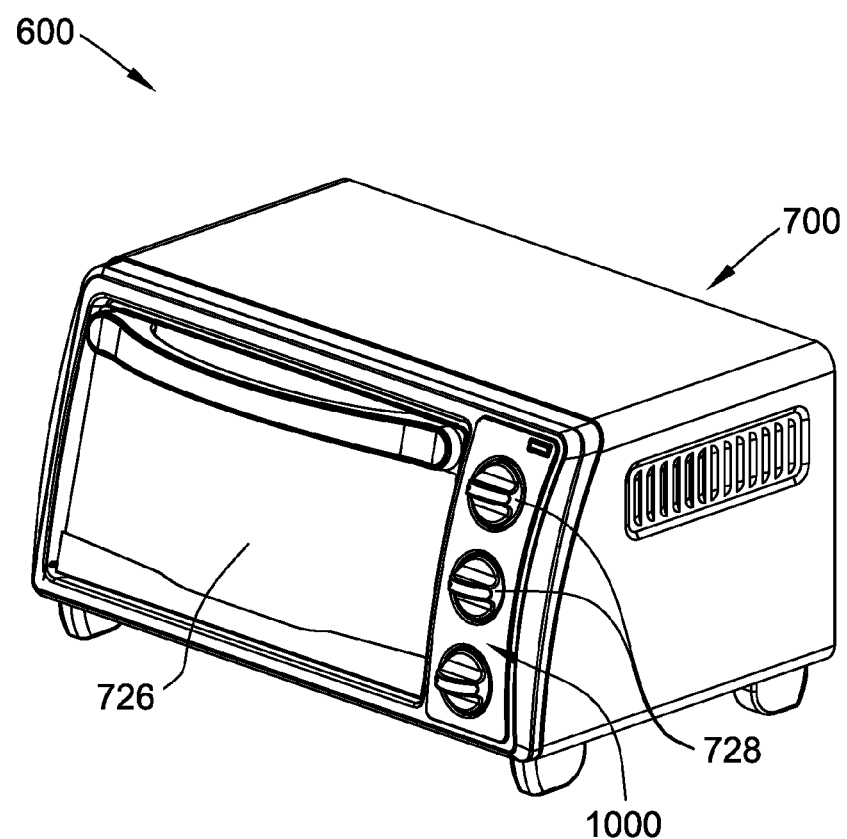
FIG. 10 is a perspective view of another embodiment of a heating appliance.
Figure 23:
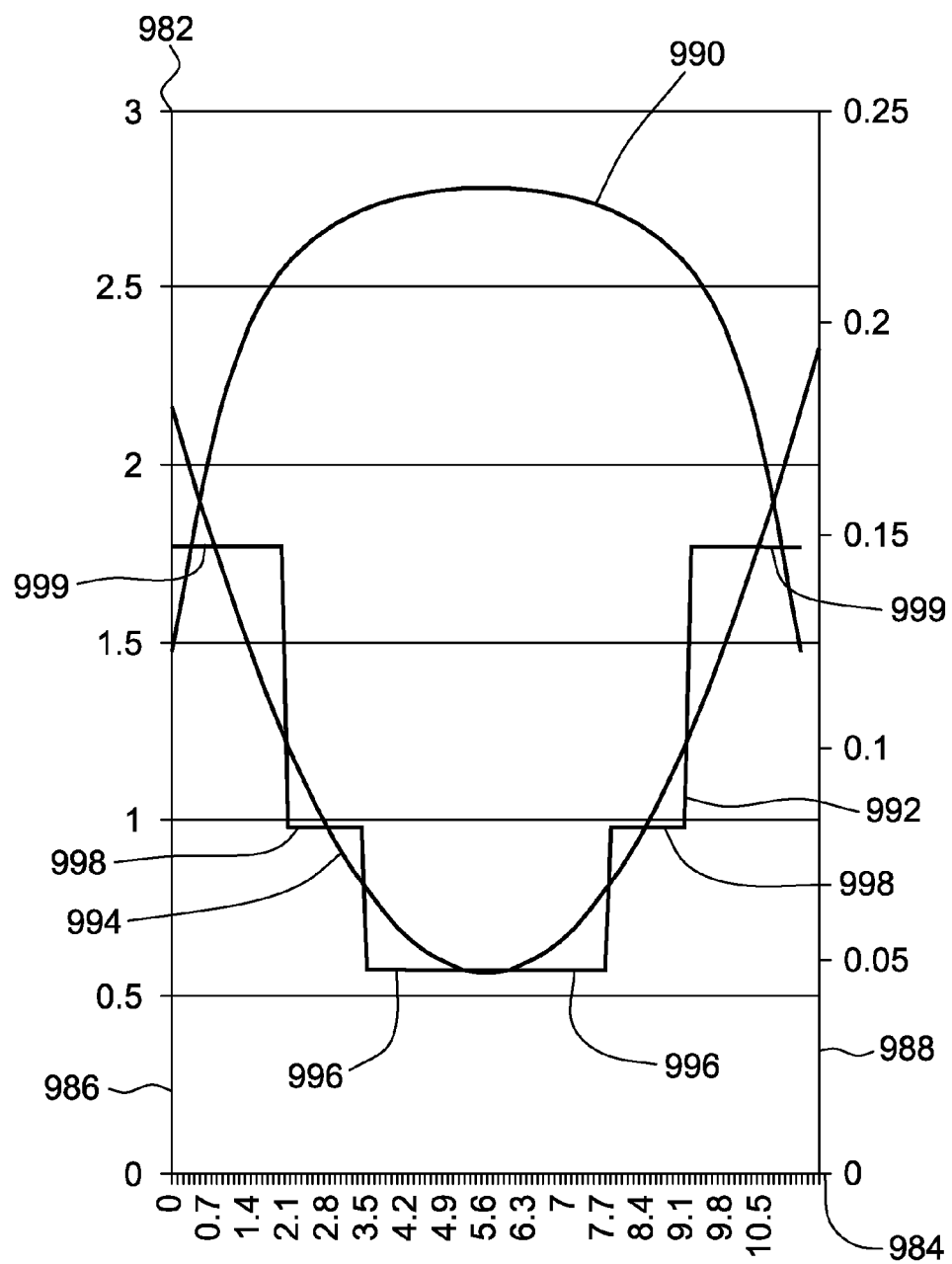

FIGS. 22(a)-22(c) illustrate a table of data relating to the heating appliance of FIG. 10; and FIG. 23 is a graphical representation of the data of FIGS. 22(a)-22(c).

Corresponding reference characters indicate corresponding parts throughout the several views of the drawings.

DETAILED DESCRIPTION

Referring now to the drawings, and in particular to FIGS. 1-7, a heating appliance (e.g., a toaster oven) according to one embodiment is indicated generally by the reference numeral 100. The illustrated heating appliance 100 comprises a housing (indicated generally at 200), an upper heating assembly (indicated generally at 300 in FIG. 3), a lower heating assembly (indicated generally at 400 in FIG. 2), and a heat control system (indicated generally at 500).

The illustrated housing 200 has an exterior frame 202, an interior frame 204, a front panel assembly 206, a rear panel assembly (not shown), and a bottom panel assembly 208. The exterior frame 202, the interior frame 204, the front panel assembly 206, the rear panel assembly, and the bottom panel assembly 208 may be fabricated using any material suitable for the associated functions described herein.

The exterior frame 202 has a first exterior side panel 210, a second exterior side panel 212, and an exterior top panel 214. Similarly, the interior frame 204 has a first interior side panel 216, a second interior side panel 218, and an interior top panel 220. The front panel assembly 206 and the rear panel assembly are fastened to the exterior frame 202 and/or the interior frame 204 to define a pair of adjacent interior compartments (namely, a food product compartment 222 and a thermostat compartment 224). The food product compartment 222 and the thermostat compartment 224 are separated by the first interior side panel 216. A food product compartment door 226 and a user interface (e.g. a plurality of knobs 228) are connected to the housing 200 at the front panel assembly 206, and vents 230 are suitably defined in the housing 200 for ventilating the housing 200 (e.g., for ventilating the thermostat compartment 224). A thermostat (not shown) is suitably mounted within the thermostat compartment 224 and is operatively connected (e.g., via wiring) to the knobs 228 and the heating assemblies 300, 400 to facilitate enabling a user to regulate the temperature and/or duration of heating within the food product compartment 222.

With particular reference now to the food product compartment 222, the first interior side panel 216 and the second interior side panel 218 define at least one channel 232 for supporting a food rack (not shown) that extends across the food product compartment 222 at an orientation that is substantially parallel to the bottom panel 208 of the food product compartment 222. A front lower reflector 234 and a rear lower reflector 236 are disposed on opposing sides of, and extend substantially across, the bottom panel 208 of the food product compartment 222. Similarly, a front upper reflector 238 and a rear upper reflector 240 are disposed on opposing sides of, and extend substantially across, the interior top panel 220 within the food product compartment 222. The reflectors 234, 236, 238, 240 may be fabricated from any suitable material and may be suitably formed integrally with, or separate from and connected to, the first interior side panel 216, the second interior side panel 218, the interior top panel 220, and/or the bottom panel 208 within the food product compartment 222.

The upper heating assembly 300 extends across the food product compartment 222 above the channels 232 from the first interior side panel 216 to the second interior side panel 218 such that the upper heating assembly 300 is disposed above the rack for heating the food product compartment 222 from above a food product (e.g., bread) disposed on the rack. Similarly, the lower heating assembly 400 extends across the food product compartment 222 below the channels 232 from the first interior side panel 216 to the second interior side panel 218 such that the lower heating assembly 400 is disposed below the rack for heating the food product compartment 222 from below the food product disposed on the rack. Alternatively, the heating assemblies 300, 400 may have any suitable location within the food product compartment 222.

Figure 1:
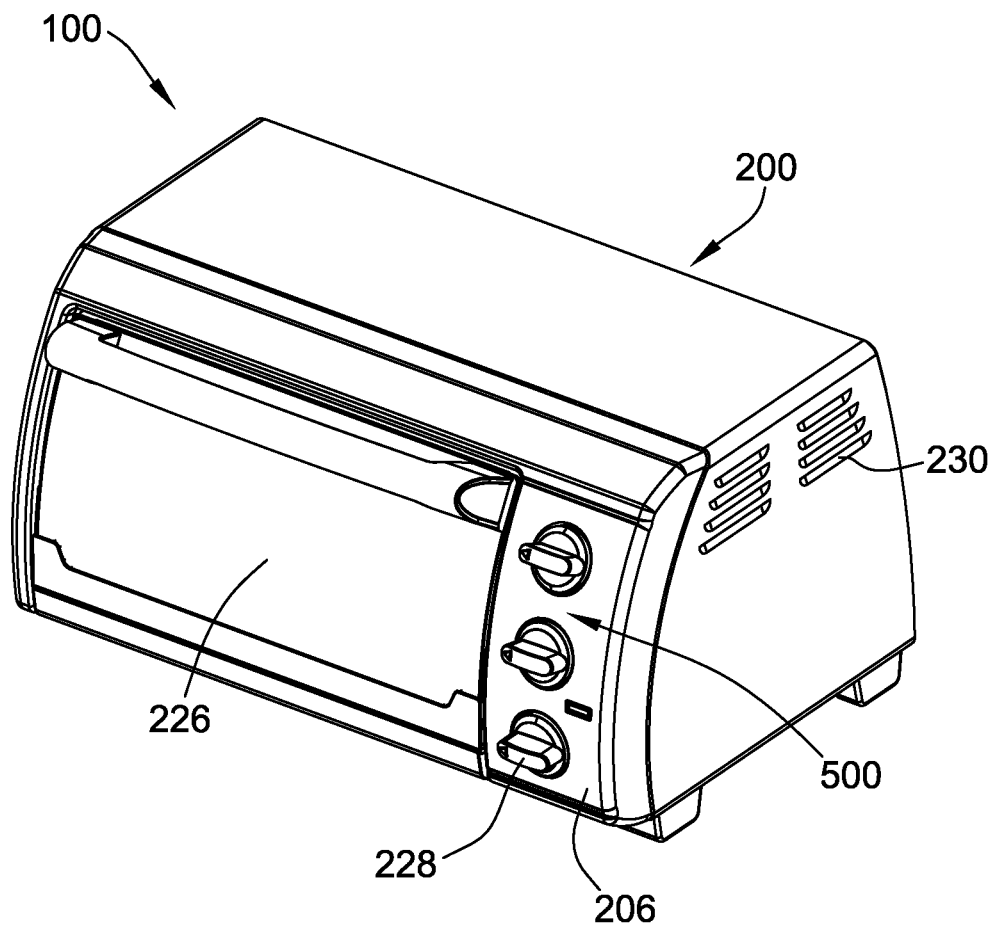
FIG. 1 is a perspective view of one embodiment of a heating appliance.
Figure 2:
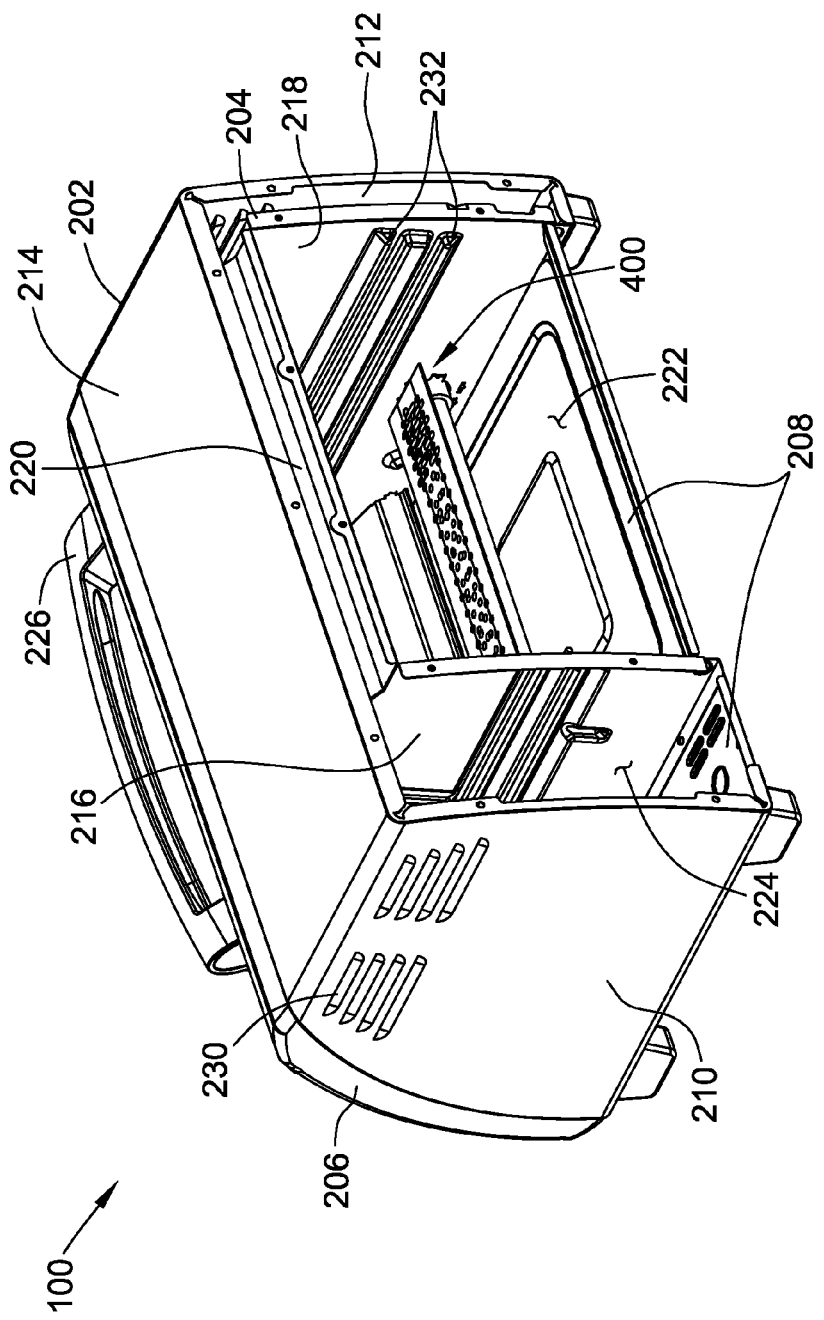
FIG. 2 is a rear perspective view of the heating appliance of FIG. 1 with a rear panel omitted to show interior components.
Figure 3:
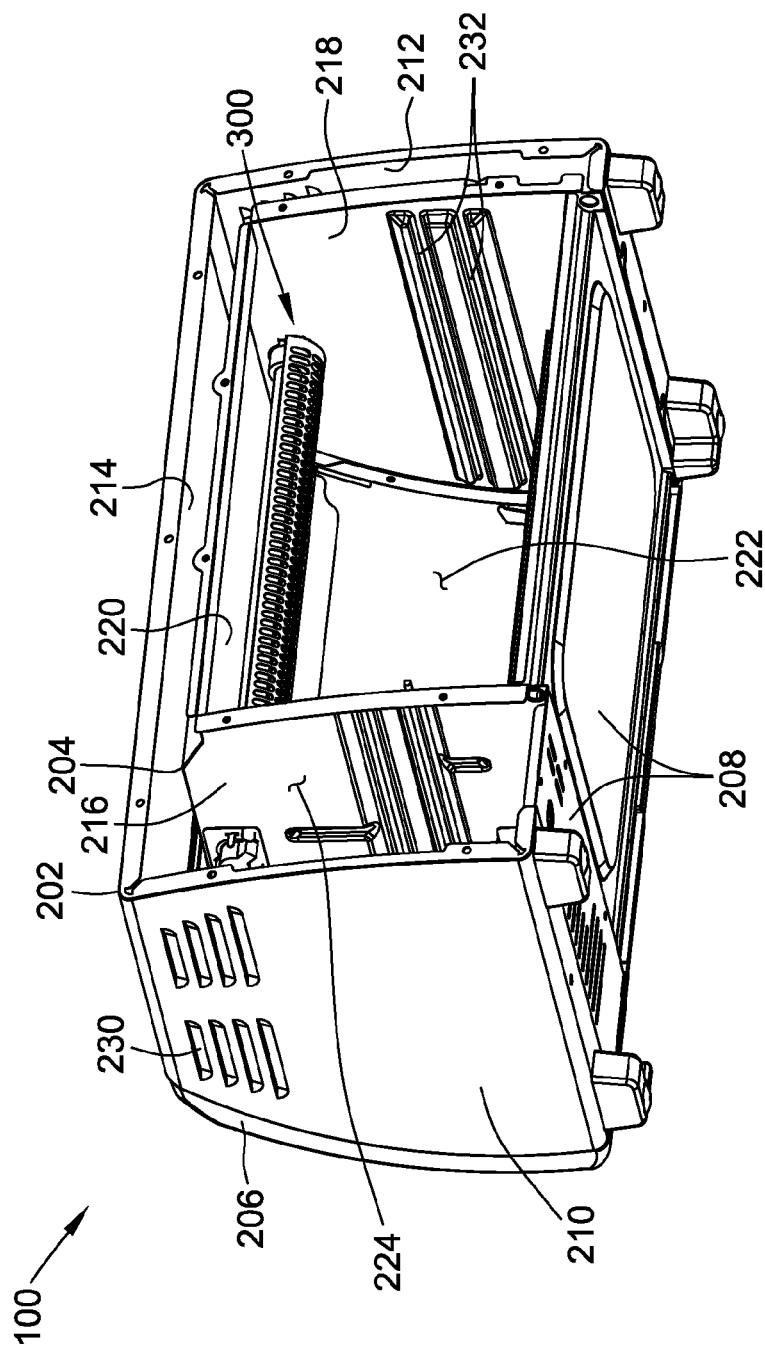
FIG. 3 is a different rear perspective view of the heating appliance of FIG. 1 with the rear panel omitted.
Figure 4:
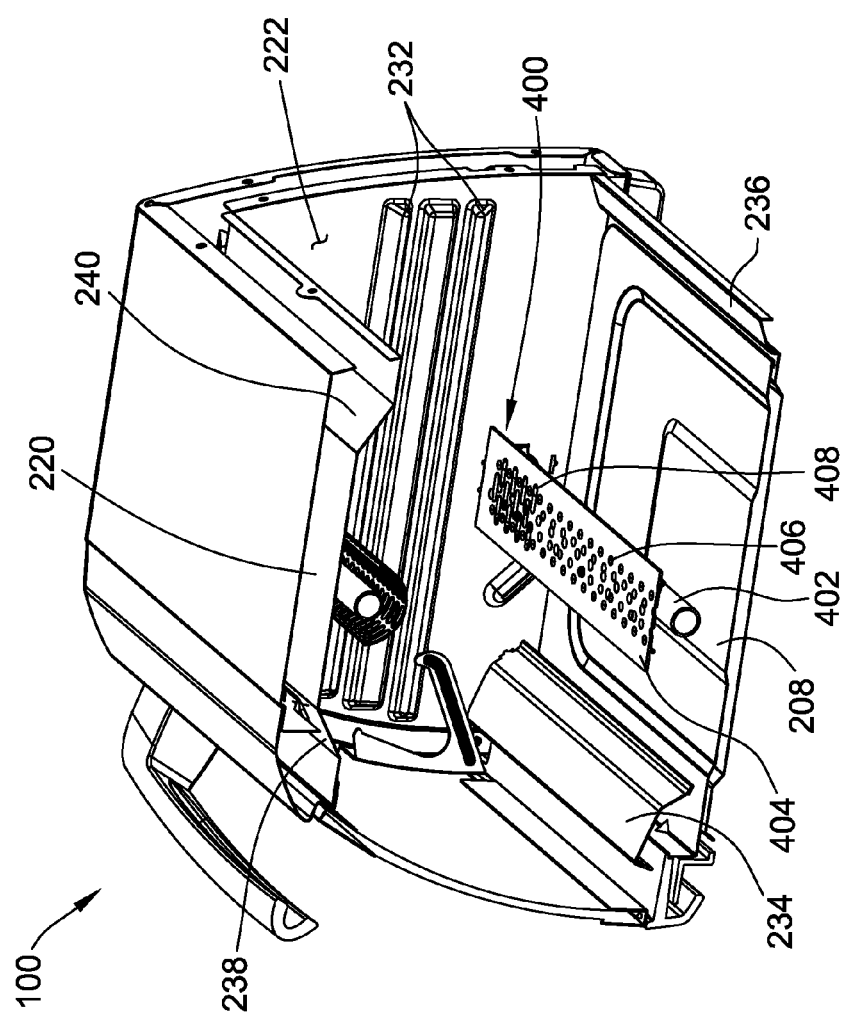
FIG. 4 is a vertical cross-section of the heating appliance of FIG. 1 with the rear panel omitted.
Figure 5:
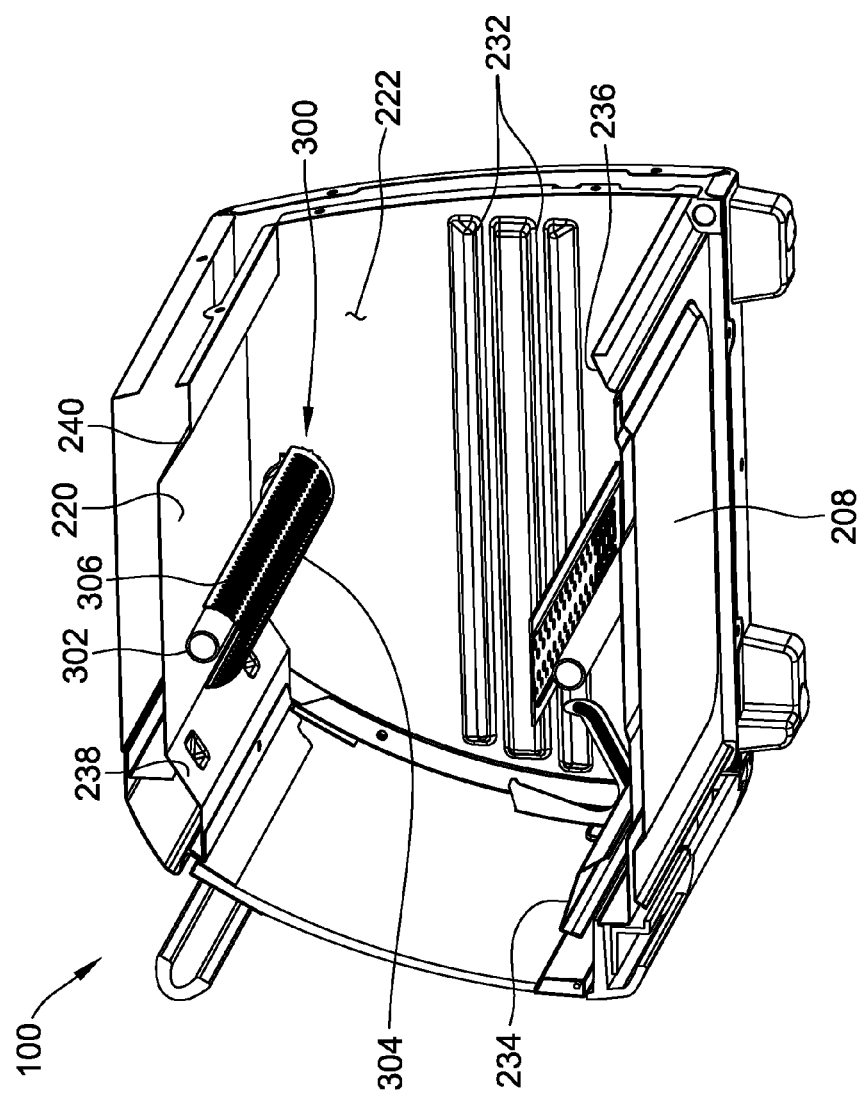
FIG. 5 is different view of the vertical cross-section of FIG. 4.

The upper heating assembly 300 includes a generally cylindrical and generally linearly extending upper heating device 302 (FIG. 6), along with a generally semi-cylindrical and generally linearly extending upper heat distribution member 304. The upper heat distribution member 304 is spaced below the upper heating device 302 and includes a plurality of parallel rows (e.g., four parallel rows) of elongated apertures 306 as best illustrated in FIG. 5. Each row extends along substantially the length of the upper heat distribution member 304 (i.e., substantially across the food product compartment 222 from the first interior side panel 216 to the second interior side panel 218). Alternatively, the upper heat distribution member 304 may be configured in the same manner as the heat distribution member of the lower heating assembly 400, which is described in more detail below. During operation of the upper heating device 302, the upper heat distribution member 304 serves to diffract heat waves emitted from the upper heating device 302, thereby facilitating a more even distribution of heat incidence from the upper heating device 302 over the food product. The upper heat distribution member 304 may also serve to facilitate preventing a larger food product from contacting the upper heating device 302 within the food product compartment 222. The upper heat distribution member 304 may be mounted in any suitable manner and may be fabricated using any material suitable for the functions described herein. As used herein, the term "heat distribution member" is intended to broadly refer to any structure that facilitates changing (e.g., diffracting, deflecting, and/or reflecting) the direction of at least some heat waves (i.e., radiant energy) from the heating device over the food product.

The lower heating assembly 400 includes a generally cylindrical and generally linearly extending lower heating device 402 (FIG. 6), along with a generally planar and generally linearly extending lower heat distribution member 404 (e.g., the heat distribution member 404 is not bent in some embodiments). The lower heat distribution member 404 is spaced above the lower heating device 402 and includes a plurality of apertures 406, 408 (FIG. 4) arranged in a pattern (i.e., a diffraction grating pattern) that is described in more detail below. During operation of the lower heating device 402, the lower heat distribution member 404 serves to diffract heat waves emitted from the lower heating device 402, thereby facilitating a more even distribution of heat incidence from the lower heating device 402 over the food product. The lower heat distribution member 404 may be mounted in any suitable manner and may be fabricated using any material suitable for the functions described herein (e.g., the lower heat distribution member 404 may be fabricated from a low carbon steel coated in an aluminum-silicon alloy having about 5-11 percent silicon (a "type-1 aluminized steel" material)).

Figure 6:
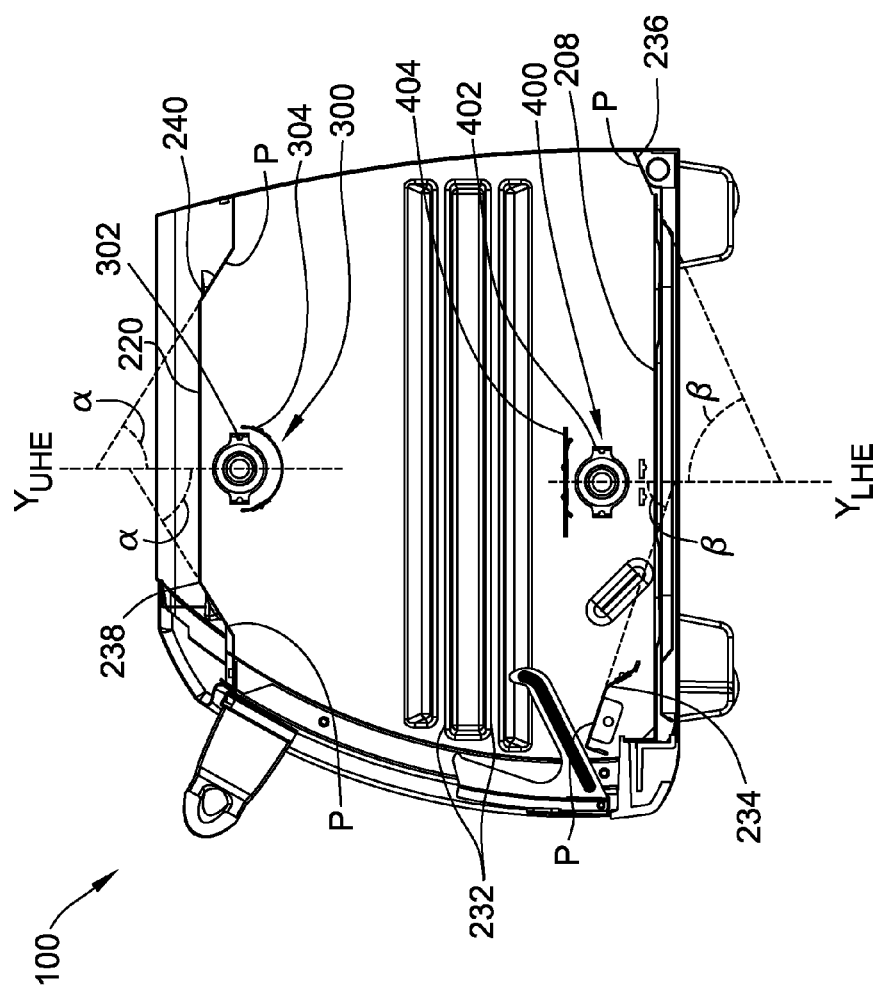
FIG. 6 is a side elevation of the cross-section of FIGS. 4 and 5.
Figure 7:
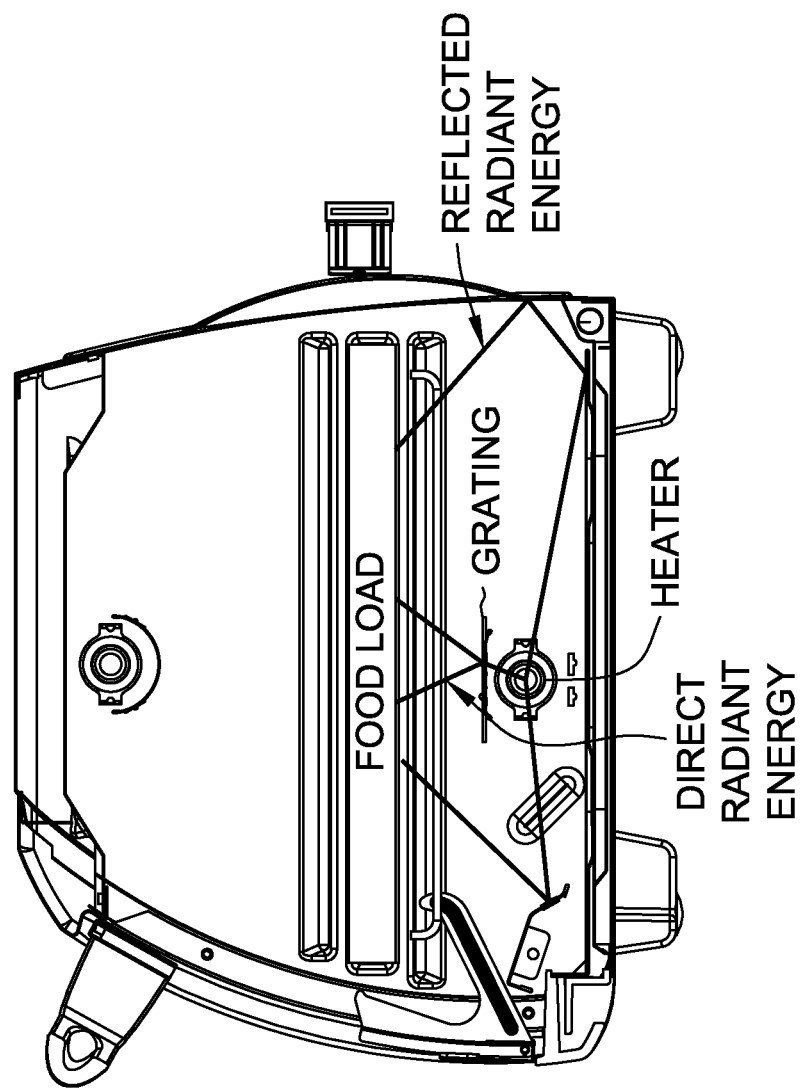
FIG. 7 is a schematic representation of radiant energy transmitted to a food product from a lower heating device of the heating appliance of FIG. 1 during operation.

As shown in FIG. 6, the upper heating assembly 300 and the lower heating assembly 400 may be offset relative to one another (e.g., the lower heating assembly 400 may be located more frontward than the upper heating assembly 300). Also, the linear profile P of each upper reflector 238, 240 may be obliquely oriented at an angle α relative to a vertical axis $Y_{UHE}$ through the upper heating device 302 (e.g., at an angle α of between about 35° and about 55°). Similarly, the linear profile P of each lower reflector 234, 236 may be obliquely oriented at an angle β relative to a vertical axis $Y_{LHE}$ of the lower heating device 402 (e.g., an angle β of between about 35° and about 55°). In this manner, the reflectors 234, 236, 238, 240 are oriented to facilitate reflecting heat waves from the heating devices 302, 402 toward the food product disposed on the rack. With reference to FIG. 7, some radiant energy from the lower heating device 402 ("reflected radiant energy") may be reflected onto the food product via the reflectors 234, 236, 238, 240 and/or the panels 208, 216, 218, 220, and some radiant energy from the lower heating device 402 ("direct radiant energy") may be emitted directly onto the food product via the lower heat distribution member 404 (e.g., is not reflected but, rather, is deflected or diffracted onto the food product as described in more detail below).

Figure 8:
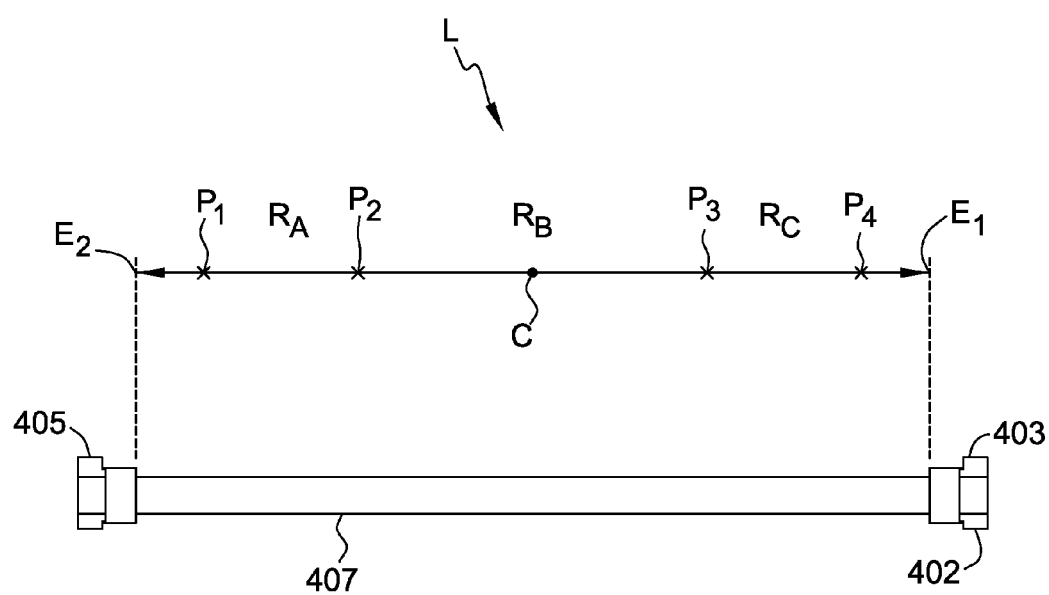
FIG. 8 is a side elevation of the lower heating device of the heating appliance of FIG. 1.

As shown in FIG. 8, the lower heating device 402 has a first support 403, a second support 405, and a heating element 407 (e.g., a quartz heating element) extending from the first support 403 to the second support 405. The supports 403, 405 are suitably configured to facilitate mounting the lower heating device 402 within the food product compartment 222. The heating element 407 has a first end $E_1$ adjacent the first support 403, a second end $E_2$ adjacent the second support 405, and a length L measured from the first end $E_1$ to the second end $E_2$. The length L has a center C.

In the illustrated embodiment, the heating element 407 emits radiant energy unevenly along its length L. For example, during operation, the heating element 407 may have a first temperature (e.g., about 657.5° F.) at a first point $P_1$ along the length L, a second temperature (e.g., about 761.2° F.) at a second point $P_2$ along the length L, a third temperature (e.g., about 729.3° F.) at a third point $P_3$ along the length L, and a fourth temperature (e.g., about 624.4° F.) at a fourth point $P_4$ along the length L. The first point $P_1$ is proximate the second end $E_2$, and the fourth point $P_4$ is proximate the first end $E_1$. The second point $P_2$ is between the center C and the first point $P_1$, and the third point $P_3$ is between the center C and the fourth point $P_4$. A first temperature region $R_A$ is therefore defined between the first point $P_1$ and the second point $P_2$; a second temperature region $R_B$ is therefore defined between the second point $P_2$ and the third point $P_3$; and a third temperature region $R_C$ is therefore defined between the third point $P_3$ and the fourth point $P_4$. In this manner, the temperature of the heating element 407 decreases about 100° F. along the first region $R_A$ (i.e., from the second point $P_2$ to the first point $P_1$), and the temperature of the heating element 407 decreases about 100° F. along the third temperature region $R_C$ (i.e., from the third point $P_3$ to the fourth point $P_4$). In other embodiments, the heating element 407 may have a more even or uneven temperature distribution along any suitable dimension (e.g., its length, its width, its surface area, etc.).

Figure 9:
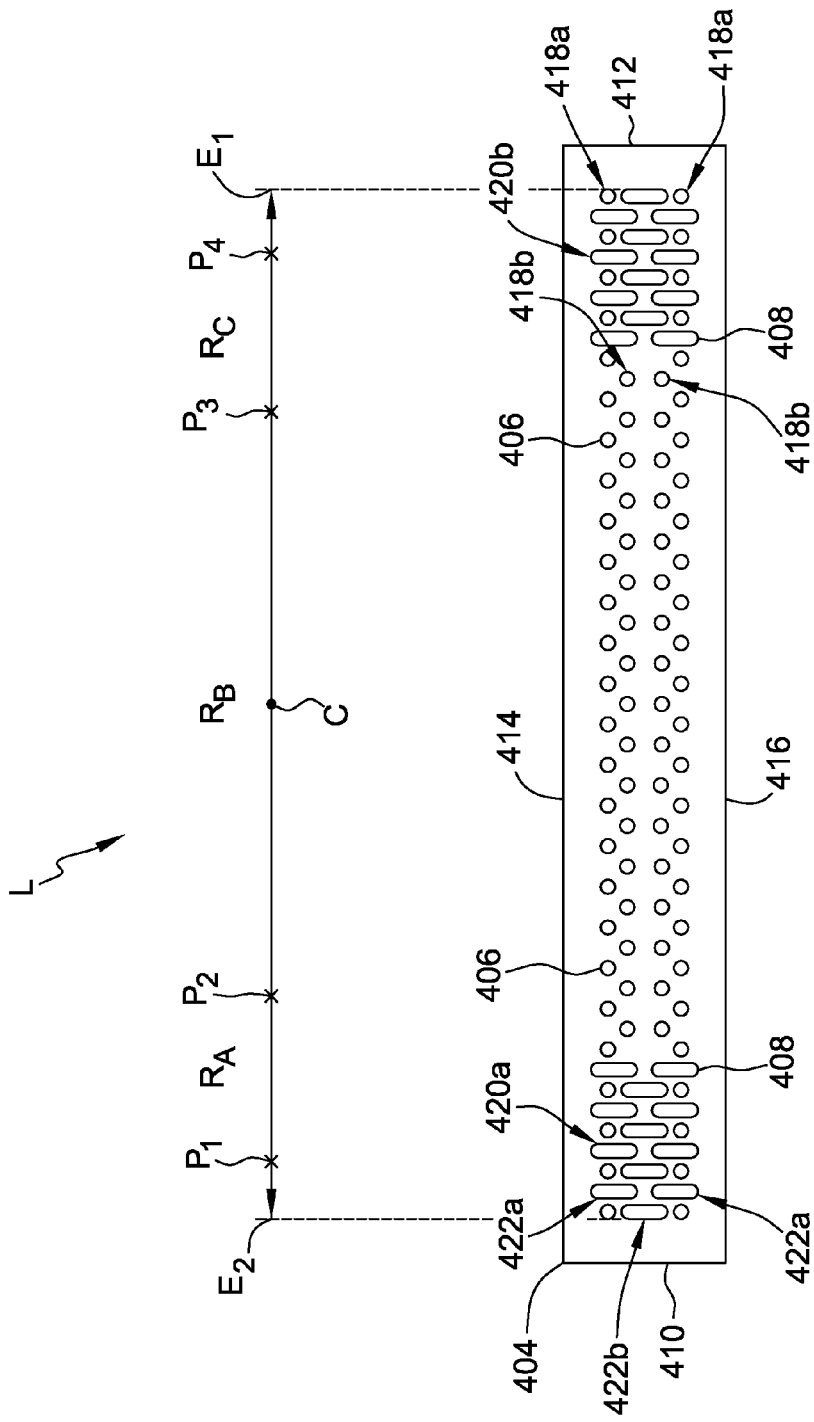
FIG. 9 is a top plan view of a lower heat distribution member of the heating appliance of FIG. 1.

Referring now to FIG. 9, the lower heat distribution member 404 has a first end 410, a second end 412, and a pair of sides 414, 416 extending from the first end 410 to the second end 412. The lower heat distribution member 404 includes a combination of substantially circular apertures 406 and elongated apertures 408. The apertures 406 are arranged in rows (indicated generally at 418a, 418b) (e.g., four parallel rows 418a, 418b) and are spaced apart from one another within each respective row 418a, 418b. The two outer rows 418a extend substantially along the overall length of the lower heat distribution member 404, while the two inner rows 418b extend along only about three-fifths of the overall length of the lower heat distribution member 404. The inner rows 418b are located closer to the outer rows 418a than to one another. Additionally, the apertures 406 of each inner row 418b are substantially aligned with the apertures 406 of the other inner row 418b, while the apertures 406 each inner row 418b are offset relative to (i.e., located between) the apertures 406 of the adjacent outer row 418a.

The apertures 408 are arranged in two groups (indicated generally at 420a and 420b). The first group 420a is located along a segment that comprises about one-fifth of the overall length of the lower heat distribution member 404 adjacent the first end 410, and the second group 420b is located along a different segment that also comprises about one-fifth of the overall length of the lower heat distribution member 404 adjacent the second end 412. Each group 420a, 420b has a plurality of rows (indicated generally at 422a, 422b) (e.g., namely a pair of outer rows 422a and an inner row 422b), and the apertures 408 are spaced apart from one another within each respective row 422a, 422b. The outer rows 422a of apertures 408 are intersticed with the outer rows 418a of apertures 406 (i.e., each aperture 408 of each outer row 422a extends through a space between adjacent apertures 406 of one of the outer rows 418a). The inner rows 422b are offset relative to the outer rows 422a such that the inner rows 422b are closer to the ends 410, 412 of the lower heat distribution member 404 than the associated outer rows 422a.

In alternative embodiments, the lower heat distribution member 404 may have any suitable contour (e.g., the lower heat distribution member 404 may be generally semi-cylindrical, similar to the upper heat distribution member 304), and the apertures 406, 408 of the lower heat distribution member 404 may be arranged in any suitable manner that facilitates enabling the lower heat distribution member 404 to function as described herein (e.g., the lower heat distribution member 404 may have any suitable number of apertures 406, 408 aligned in any suitable manner relative to one another).

During operation of the lower heating device 402 and in accordance with the above-described temperature variations along the heating element 407, the lower heat distribution member 404 serves to more evenly distribute (e.g., deflect and/or diffract) heat waves emitted from the lower heating device 402 onto the food product, thereby facilitating a more even distribution of heat incidence from the lower heating device 402 over the food product. It can be seen in FIG. 9 that the apertures 406, 408 are arranged in a pattern that relates to (e.g., is proportional to) the variation in temperature along the length L of the heating element 407 (e.g., the lower heat distribution member 404 has more and/or larger apertures associated with temperature regions $R_A$ and $R_C$ than temperature region $R_B$), thereby reducing an uneven distribution of heat incidence over the food product that may have otherwise resulted from the temperature variation along the heating element 407.

In some embodiments, the apertures may be sized and/or located in any suitable manner that facilitates enabling the lower heat distribution member 404 to more evenly distribute direct radiant energy from the heating element 407 over the food product in accordance with any suitable variation in temperature along the heating element 407 (e.g., the apertures may be shaped as squares or rectangles and may be curvilinearly arranged rather than being arranged in rows). It should also be noted that the material of, or manufacturing processes used to make, the lower heat distribution member 404 may allow for greater flexibility in aperture sizes and/or patterns, thereby influencing the heat distribution effects of the lower heat distribution member 404.

When heating a food product within the heating appliance 100, the direct radiant energy emitted from the heating devices is some of the higher intensity energy to contact the food product. Providing the above-described heat distribution members 304, 404 with diffraction grating facilitates more even dispersing of this higher intensity, direct radiant energy from the respective heating devices 302, 402 over the food product. The reflected radiant energy (e.g., energy emitted from the heating devices 302, 402 and reflected by the reflectors 234, 236, 238, 240 and/or the panels 208, 216, 218, 220 of the food product compartment 222 onto the food product) is some of the lower intensity energy to contact the food product within the heating appliance. This reflected radiant energy can be more evenly dispersed by optimizing the arrangement and/or the contours of the reflectors 234, 236, 238, 240 and/or the panels 208, 216, 218, 220 of the food product compartment 222 as described above.

As such, the embodiments of the heating appliance 100 described herein facilitate optimizing the utilization of reflectors, heating devices, and/or heat distribution members relative to one another, and relative to a food product, within the heating appliance 100 (e.g., the relative configuration of heat distribution members and reflectors can be optimized to complement one another to facilitate yielding a net distribution of radiant energy that is more even over the food product). In one embodiment, the heat distribution member could be configured to permit a desired amount of direct radiant energy to pass through such that a resultant incidence of radiant energy (direct and reflected) on the food product from all components inside the food product compartment (e.g., from the heating devices, the reflectors, and the panels) is more evenly distributed over the food product. For example, in one embodiment, the grating pattern of the lower heat distribution member 404 may be configured using the following equation:

$$G(l) = [E(l) + R(l)] - T_{OPTIMAL}$$

wherein:
l is a given point along the length of the heating element;
G(l) is the amount of direct radiant energy blocked by the lower heat distribution member at a given point along the length of the heating element;
E(l) is the amount of direct radiant energy emitted by the heating element at a given point along the length of the heating element;
R(l) is the amount of reflected radiant energy emitted by the heating element at a given point along the length of the heating element; and
$T_{OPTIMAL}$ is a constant desired amount of radiant energy imparted on an associated food product at a given point along the length of the heating element.
(It should be noted that the sum of E(l) and R(l) is representative of all radiant energy imparted onto the food product by the heating element at a given point along the length of the heating element, with E(l) being independent of the reflected radiant energy R(l), while R(l) may be affected by E(l) and G(l))

Moving on to FIGS. 10-15, another embodiment of a heating appliance (e.g., another toaster oven) is indicated generally by the reference numeral 600. Like the heating appliance 100 of FIGS. 1-7, the heating appliance 600 includes a housing (indicated generally at 700), an upper heating assembly (indicated generally at 800), a lower heating assembly (indicated generally at 900), and a heat control system (indicated generally at 1000). Notably, components of the heating appliance 600 may be useful in conjunction with components of the heating appliance 100, and vice versa (e.g., the lower heating assembly 900 of the heating appliance 600 could be used in lieu of the lower heating assembly 400 of the heating appliance 100 in some embodiments).

Figure 11:
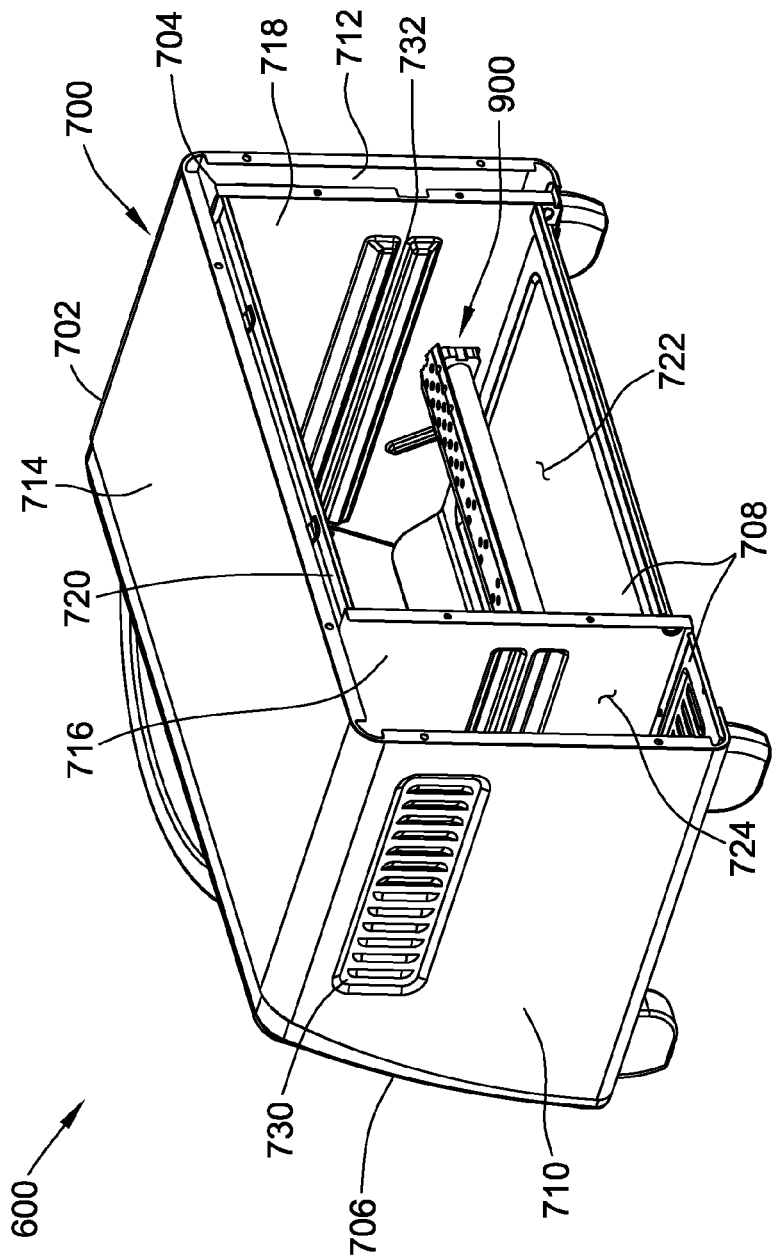
FIG. 11 is a rear perspective view of the heating appliance of FIG. 10 with a rear panel omitted to show interior components.
Figure 12:
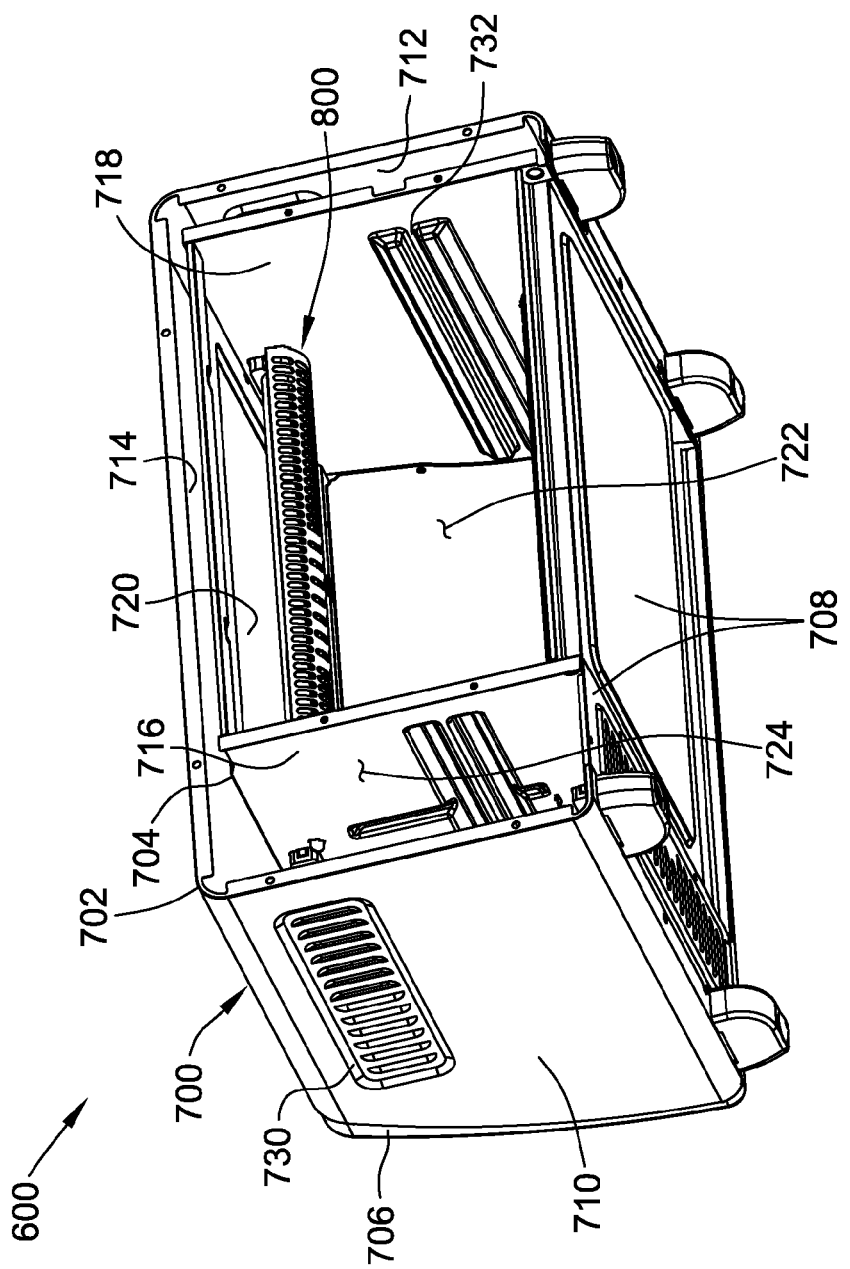
FIG. 12 is a different rear perspective view of the heating appliance of FIG. 10 with the rear panel omitted.

As illustrated in FIGS. 11 and 12, the housing 700 is made up of an exterior frame 702 and an interior frame 704, which are attached to a front panel assembly 706, a rear panel assembly (not shown), and a bottom panel assembly 708. The exterior frame 702 is segmented into a first exterior side panel 710, a second exterior side panel 712, and an exterior top panel 714. Likewise, the interior frame 704 is segmented into a first interior side panel 716, a second interior side panel 718, and an interior top panel 720. Optionally, the exterior frame 702, the interior frame 704, the front panel assembly 706, the rear panel assembly, and the bottom panel assembly 708 may be configured in any suitable manner and may be fabricated from any suitable material.

The front panel assembly 706 and the rear panel assembly are suitably fastened to the exterior frame 702 and/or the interior frame 704 to define a pair of adjacent interior compartments, namely a food product compartment 722 and a thermostat compartment 724). The food product compartment 722 and the thermostat compartment 724 are separated by the first interior side panel 716. A food product compartment door 726 (FIG. 10) and a user interface (e.g. a plurality of knobs 728 as illustrated in FIG. 10) are mounted on the housing 700 at the front panel assembly 706, and vents 730 are defined in the housing 700 at locations suitable for ventilating the housing 700 (e.g., for ventilating the thermostat compartment 724). A thermostat (not shown) is mounted within the thermostat compartment 724 and is operatively connected (e.g., via wiring) to the knobs 728 and the heating assemblies 800, 900 to facilitate enabling a user to regulate the temperature and/or duration of heating within the food product compartment 722. Additionally, the first interior side panel 716 and the second interior side panel 718 define at least one channel 732 for supporting a food rack (not shown) that extends across the food product compartment 722 at an orientation that is substantially parallel to the bottom panel 708 of the food product compartment 722.

Figure 13:
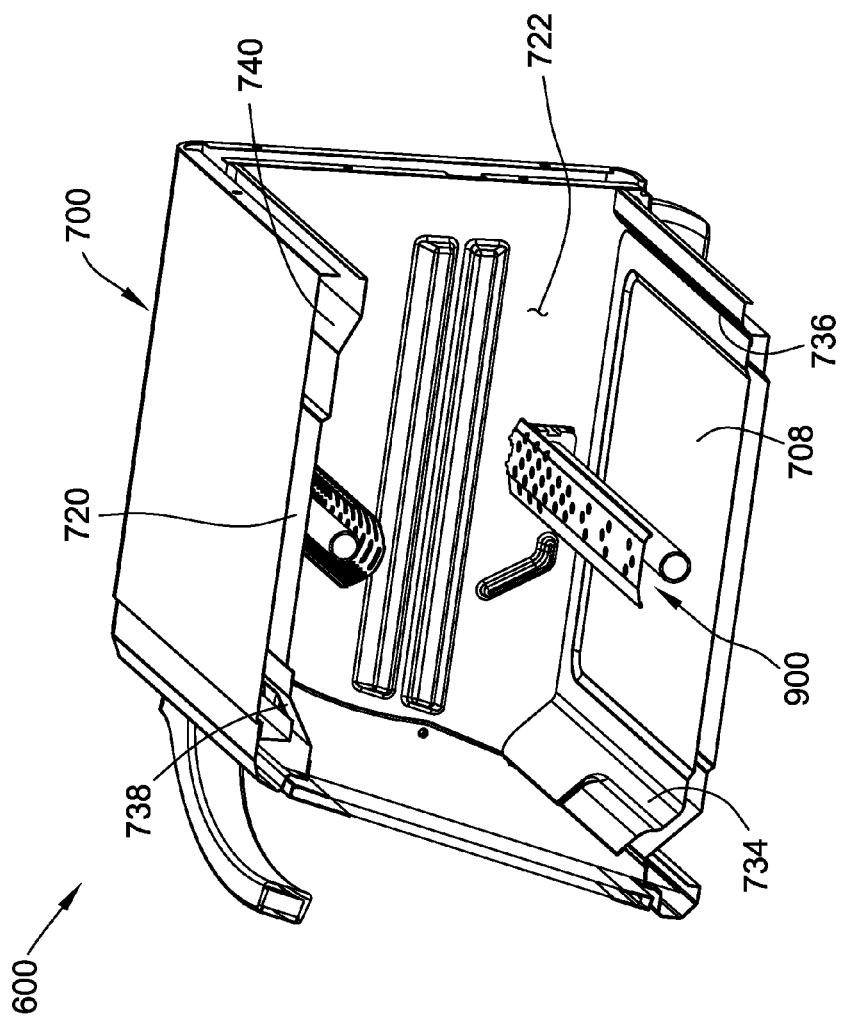
FIG. 13 is a vertical cross-section of the heating appliance of FIG. 10 with the rear panel omitted.
Figure 14:
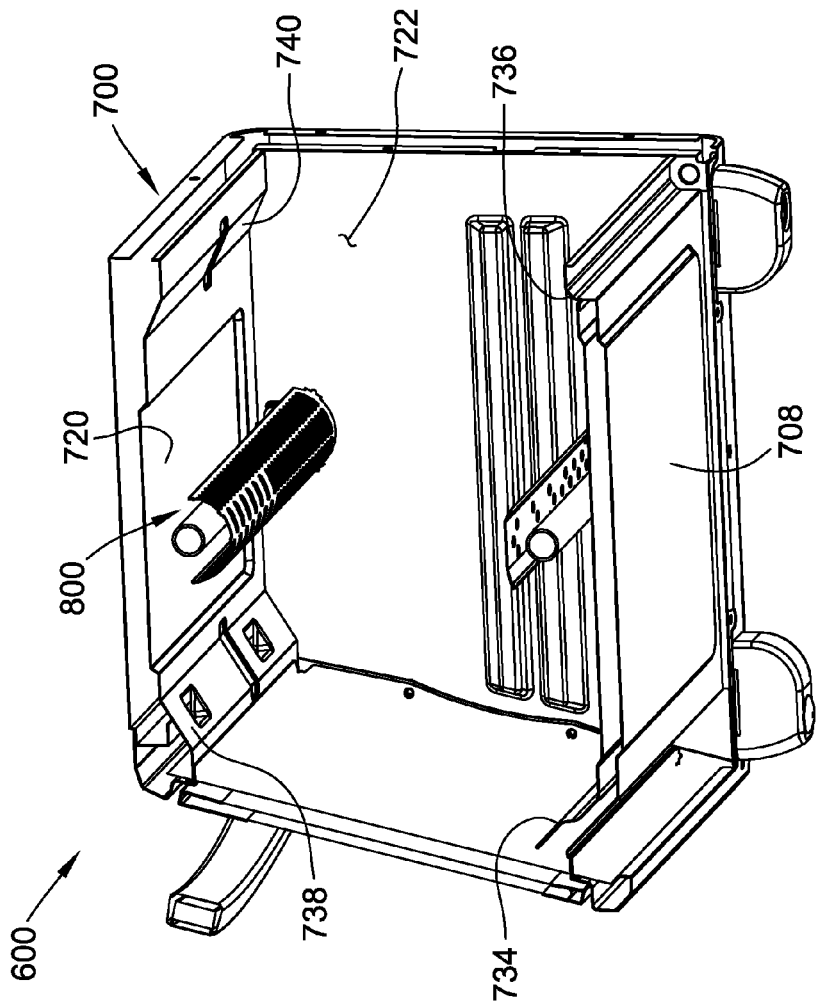
FIG. 14 is different view of the vertical cross-section of FIG. 13.

With reference to FIGS. 13 and 14, a front lower reflector 734 and a rear lower reflector 736 are disposed on opposing sides of, and extend substantially across, the bottom panel 708 within the food product compartment 722. Similarly, a front upper reflector 738 and a rear upper reflector 740 are disposed on opposing sides of, and extend substantially across, the interior top panel 720 within the food product compartment 722. The reflectors 734, 736, 738, 740 may be fabricated from any suitable material and may be suitably formed integrally with, or separately from and connected to, the first interior side panel 716, the second interior side panel 718, the interior top panel 720, and/or the bottom panel 708 within the food product compartment 722.

The upper heating assembly 800 extends across the food product compartment 722 above the channels 732 from the first interior side panel 716 to the second interior side panel 718 such that the upper heating assembly 800 is disposed above the rack for heating the food product compartment 722 from above a food product (e.g., bread) disposed on the rack. Similarly, the lower heating assembly 900 extends across the food product compartment 722 below the channels 732 from the first interior side panel 716 to the second interior side panel 718 such that the lower heating assembly 900 is disposed below the rack for heating the food product compartment 722 from below the food product disposed on the rack. Alternatively, the heating assemblies 800, 900 may have any suitable location within the food product compartment 722.

Figure 15:
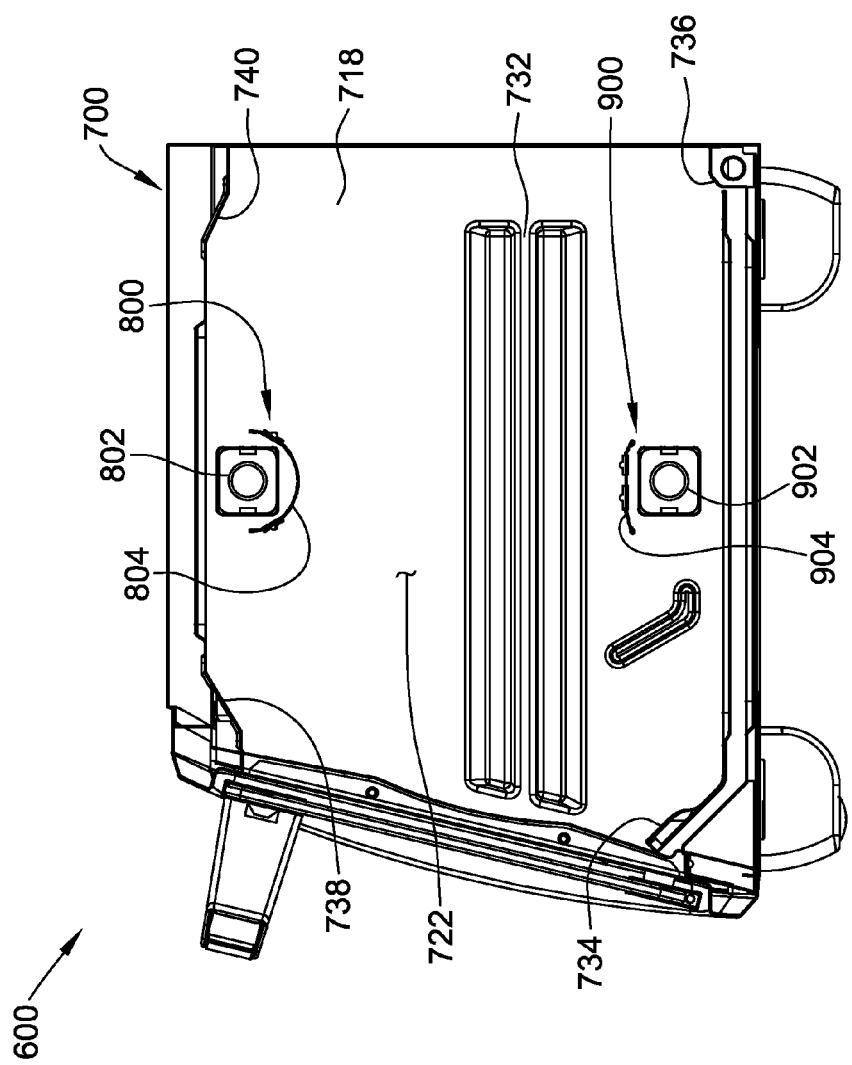
FIG. 15 is a side elevation of the cross-section of FIGS. 13 and 14.

Referring now to FIG. 15, the upper heating assembly 800 includes a generally cylindrical and generally linearly extending upper heating device 802, along with a generally semi-cylindrical and generally linearly extending upper heat distribution member 804. The upper heat distribution member 804 is spaced below (i.e., arcuately surrounds a lower portion of) the upper heating device 802 and includes a plurality of elongated apertures 806 (best seen in FIGS. 17 and 18) arranged in a pattern that facilitates evenly distributing heat incidence from the upper heating device 802 over the food product, as set forth in more detail below. Additionally, the upper heat distribution member 804 may also serve to facilitate preventing a larger food product from contacting the upper heating device 802 within the food product compartment 722. The upper heat distribution member 804 may be mounted in any suitable manner and may be fabricated using any suitable material.

Similarly, the lower heating assembly 900 includes a generally cylindrical and generally linearly extending lower heating device 902, along with a generally linearly extending lower heat distribution member 904. The lower heat distribution member 904 is spaced above the lower heating device 902 and includes a plurality of apertures 906 (best seen in FIGS. 19 and 21) arranged in a pattern that facilitates evenly distributing heat incidence from the lower heating device 902 over the food product. The lower heat distribution member 904 may be mounted in any suitable manner and may be fabricated using any suitable material (e.g., the lower heat distribution member 904 may be fabricated from a low carbon steel coated in an aluminum-silicon alloy having about 5-11 percent silicon (a "type-1 aluminized steel" material)).

In the illustrated embodiment, the upper heating assembly 800 and the lower heating assembly 900 are suitably offset a distance relative to one another (e.g., the lower heating assembly 900 may be located more frontward than the upper heating assembly 800), and the reflectors 734, 736, 738, 740 may be oriented at a suitable angle to facilitate reflecting heat waves from the heating devices 802, 902 toward a food product disposed on the rack.

Figure 16:
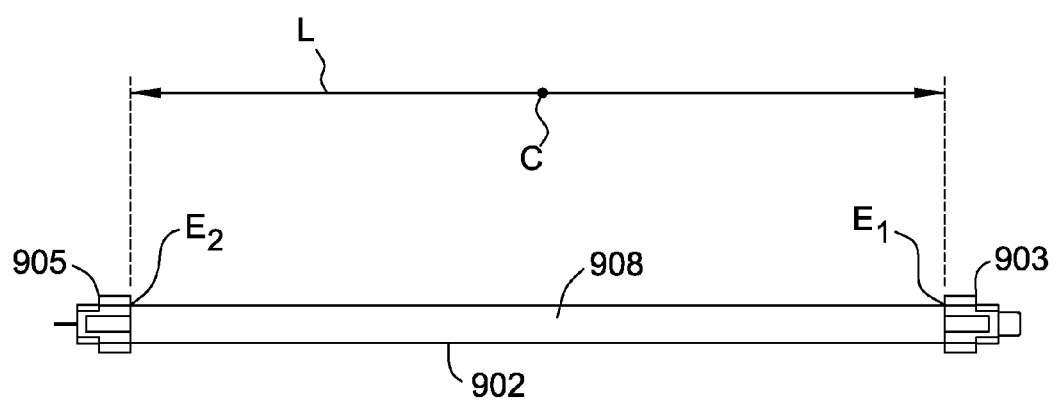
FIG. 16 is a side elevation of a lower heating device of the heating appliance of FIG. 10.

With reference to FIG. 16, the lower heating device 902 has a first support 903, a second support 905, and a heating element 908 (e.g., a quartz heating element) extending from the first support 903 to the second support 905. The supports 903, 905 are suitably configured to facilitate mounting the lower heating device 902 within the food product compartment 722 such that the heating element 908 substantially spans the food product compartment 722 adjacent the bottom panel 708. The heating element 908 has a first end E1 adjacent the first support 903, a second end E2 adjacent the second support 905, and a length L measured from the first end E1 to the second end E2 (with the length L having a center C).

The heating element 908 emits radiant energy unevenly along its length L. More specifically, in the illustrated embodiment, the temperature of the heating element 908 varies continuously from the first end E1 to the second end E2 such that the heating element 908 is coolest near its ends E1 and E2 and is hottest near its center C. In this manner, the temperature of the heating element 908 increases continuously from the first end E1 to the center, and then decreases continuously from the center to the second end E2, as set forth in more detail below. Suitably, the temperature increase/decrease may occur more rapidly along some segments of the length L and may occur more slowly along other segments of the length L (e.g., initially the temperature of the heating element 908 may increase more rapidly from the ends E1, E2 inward, and may then increase more slowly approaching the center C). Notably, in the illustrated embodiment, the upper heating device 802 is configured, and functions, in the same manner as the lower heating device 902 (e.g., the upper heating device 802 has a heating element with a temperature gradient that is substantially the same as that of the heating element 908 described above).

Figure 17:
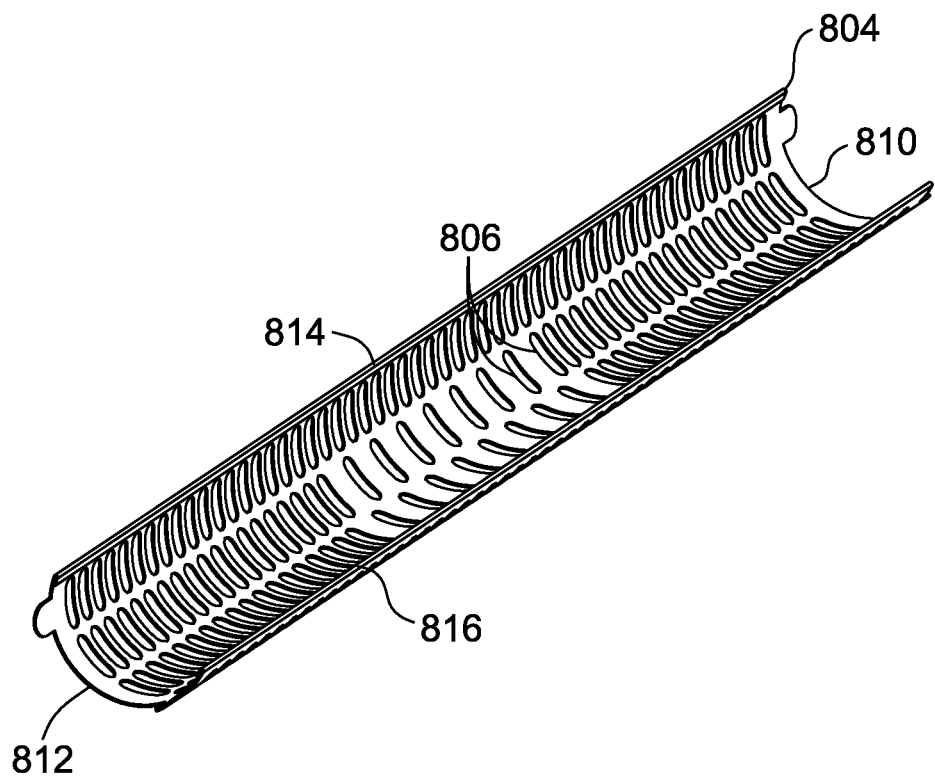
FIG. 17 is a perspective view of an upper heat distribution member of the heating appliance of FIG. 10.
Figure 18:
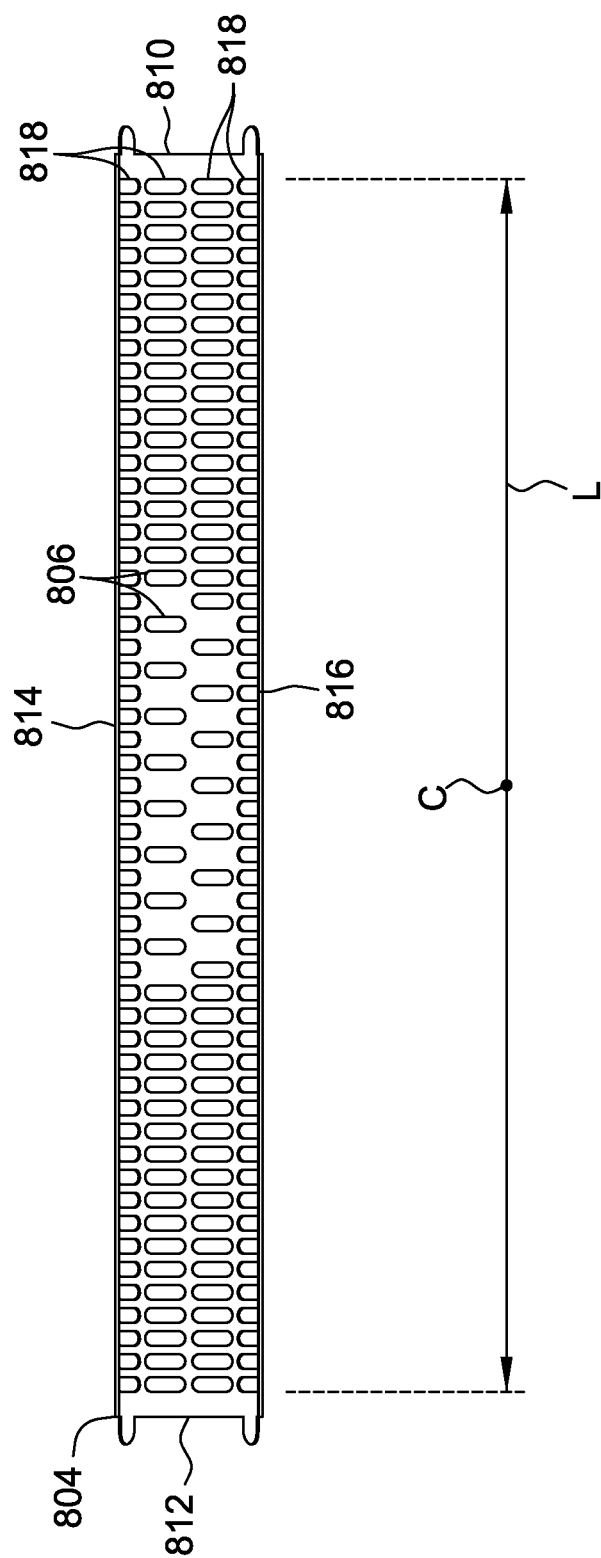
FIG. 18 is a bottom view of the upper heat distribution member of FIG. 17.

Moving on to FIGS. 17 and 18, the upper heat distribution member 804 is generally semi-cylindrical and has a first end 810, a second end 812, and a pair of sides 814, 816 extending from the first end 810 to the second end 812. The pattern of apertures 806 spans substantially from the first end 810 to the second end 812. As such, the upper heat distribution member 804 has a length L measured from where the pattern of apertures 806 begins (which is near the first end 810) to where the pattern of apertures 806 ends (which is near the second end 812) such that the length L has a center C. As best seen in FIG. 18, the apertures 806 of the upper heat distribution member 804 are arranged in a pattern that relates to (e.g., is proportional to) the variation in temperature along the length of the heating element of the upper heating device 802. More specifically, the pattern includes a plurality of rows (e.g., four parallel rows 818) of elongated apertures 806 that extend along substantially the entire length L of the upper heat distribution member 804, and each of the middle two rows 818 has a central region along which the apertures 806 are more spaced apart. As such, the upper heat distribution member 804 has less open space at its central region than at its end regions, which is a configuration that generally relates to the heating element of the upper heating device 802 being hotter at its center than at its ends. Alternatively, the upper heat distribution member 804 may be configured in the same manner as the lower heating distribution member 904, which is described in more detail below.

Figure 19:
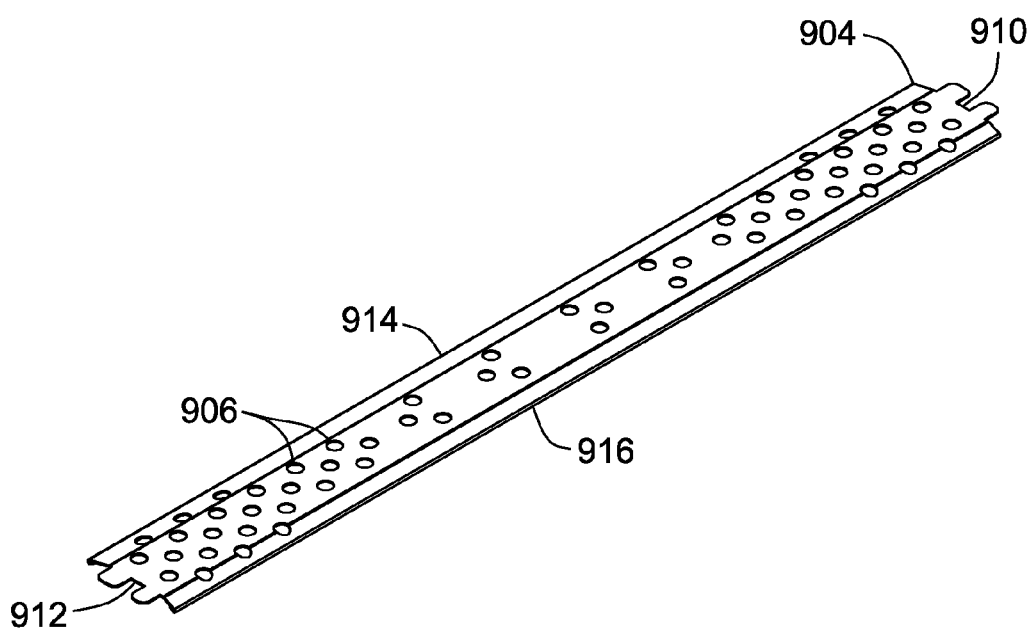
FIG. 19 is a perspective view of a lower heat distribution member of the heating appliance of FIG. 10.
Figure 20:
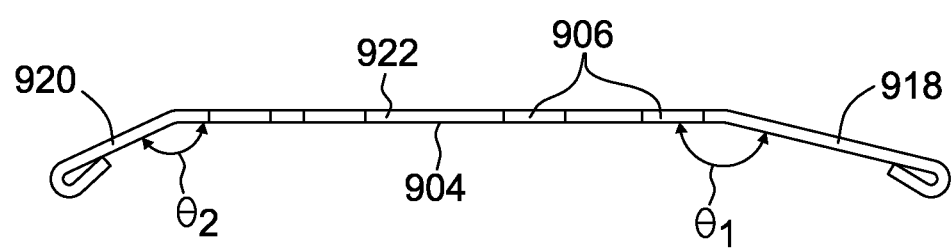
FIG. 20 is a side elevation of the lower heat distribution member of FIG. 19.
Figure 21:
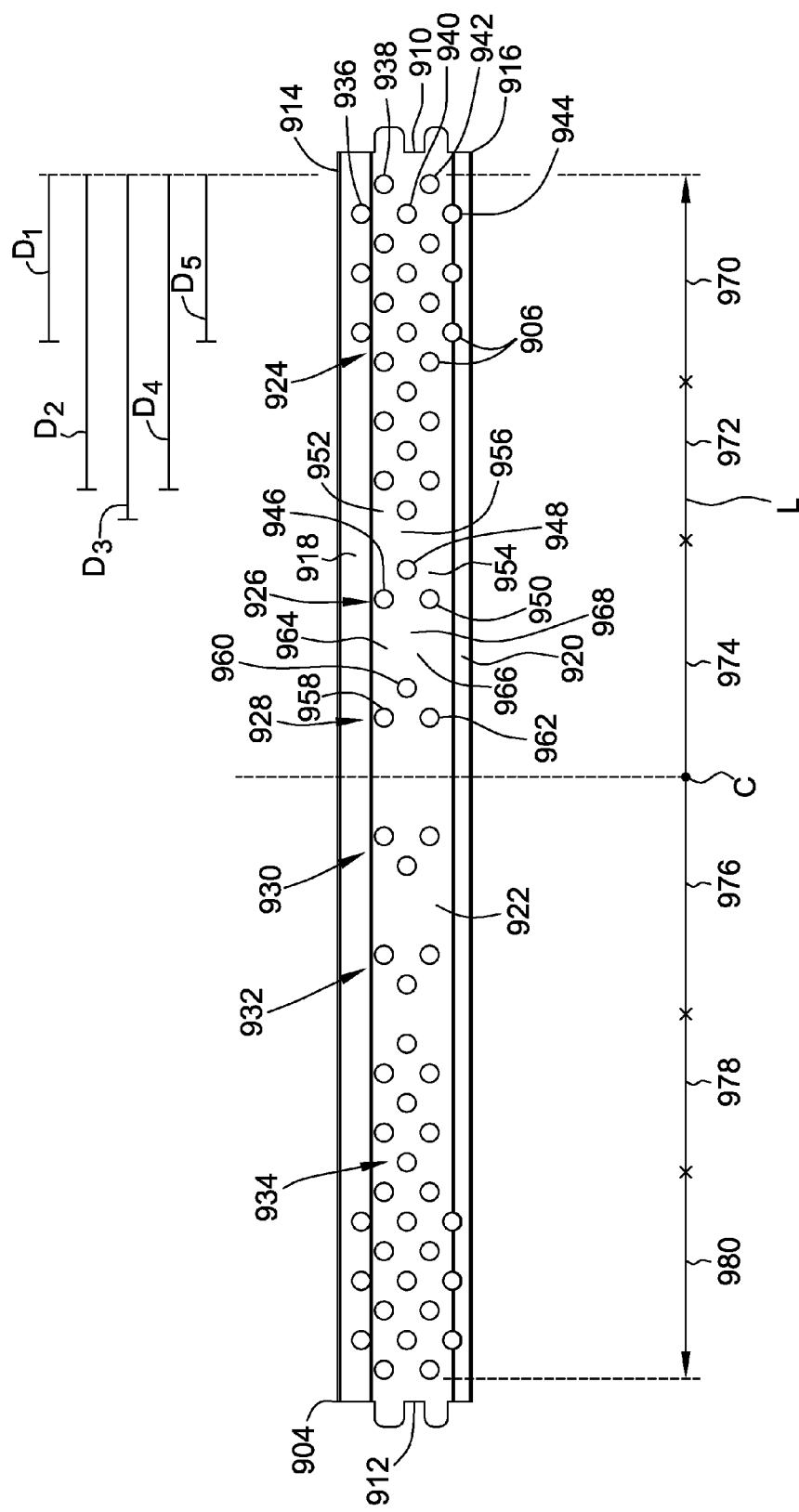
FIG. 21 is a top plan view of the lower heat distribution member of FIG. 19.

Referring now to FIGS. 19-21, the lower heat distribution member 904 has a first end 910, a second end 912, and a pair of sides 914, 916 extending from the first end 910 to the second end 912. The pattern of apertures 906 spans substantially from the first end 910 to the second end 912. As such, the lower heat distribution member 904 has a length L measured from where the pattern of apertures 906 begins (which is near the first end 910) to where the pattern of apertures 906 ends (which is near the second end 812) such that the length L has a center C.

As best seen in FIG. 20, the lower heat distribution member 904 has a planar first side portion 918, a planar second side portion 920, and a planar intermediate portion 922 extending from the first side portion 918 to the second side portion 920 to define a bent profile of the lower heat distribution member 904. The first side portion 918 and the second side portion 920 are oriented obliquely relative to the intermediate portion 922 such that a first obtuse angle $\theta_1$ is formed at the junction of the first side portion 918 and the intermediate portion 922, and a second obtuse angle $\theta_2$ is formed at the junction of the second side portion 920 and the intermediate portion 922. In the illustrated embodiment, the first obtuse angle $\theta_1$ is greater than the second obtuse angle $\theta_2$ such that the first side portion 918 is closer than the second side portion 920 to being coplanar with (i.e., not being angled relative to) the intermediate portion 922. Additionally, the first side portion 918 is longer than the second side portion 920, and the segments 918, 920 have curled edges that are smoother (or less-sharp). In alternative embodiments, however, the portions 918, 920, 922 may form any suitable edge configurations, may have any suitable lengths relative to one another, and may have any suitable orientations relative to one another (e.g., the lower heat distribution member 904 may be arcuately curved in other embodiments, rather than being bent into planar portions as illustrated).

Referring now to FIG. 21, the apertures 906 of the lower heat distribution member 904 are arranged in a pattern that relates to (e.g., is proportional to) the variation in temperature along the heating element 908, as set forth in more detail below. The pattern includes a first group (indicated generally at 924) of apertures 906, a second group (indicated generally at 926) of apertures 906, a third group (indicated generally at 928) of apertures 906, a fourth group (indicated generally at 930) of apertures 906, a fifth group (indicated generally at 932) of apertures 906, and a sixth group (indicated generally at 934) of apertures 906. The first group 924 is adjacent the first end 910, and the sixth group 934 is adjacent the second end 912. The third group 928 is adjacent the center C nearer to the first end 910 than the second end 912, and the fourth group 930 is adjacent the center C nearer the second end 912 than the first end 910. The second group 926 is between the first group 924 and the third group 928, and the fifth group 932 is between the fourth group 930 and the sixth group 934. Notably, in the illustrated embodiment, each of the groups 924, 926, 928, 930, 932, 934 is readily distinguishable from its directly adjacent group(s) (e.g., each group 924, 926, 928, 930, 932, 934 has a characteristic that makes it visibly distinct from its directly adjacent group(s) such as, for example, a visibly distinct aperture arrangement relative to the directly adjacent group(s), a visibly distinct spacing from the directly adjacent group(s), etc.).

The first group 924 includes five parallel rows of substantially equidistantly spaced apertures 906, namely a first row 936, a second row 938, a third row 940, a fourth row 942, and a fifth row 944 that are arranged in sequential order from one side 914 to the other side 916. The first row 936 includes three apertures and extends a first distance $D_1$ toward the center C from near the first end 910; the second row 938 includes six apertures and extends a second distance $D_2$ toward the center C from near the first end 910; the third row 940 includes six apertures and extends a third distance $D_3$ toward the center C from near the first end 910; the fourth row 942 includes six apertures and extends a fourth distance $D_4$ toward the center C from near the first end 910; and the fifth row 944 includes three apertures and extends a fifth distance $D_5$ toward the center C from near the first end 910.

The corresponding apertures 906 of the second and fourth rows 938, 942 are aligned with one another along the length L of the lower heat distribution member 904 (i.e., the first aperture of the second row 938 is aligned with the first aperture of the fourth row 942, the second aperture of the second row 938 is aligned with the second aperture of the fourth row 942, etc.). Similarly, the corresponding apertures of the first row 936, the third row 940, and the fifth row 944 are aligned with one another along the length L of the lower heat distribution member 904 (i.e., the first aperture of the first row 936 is aligned with the first aperture of the third row 940 and the first aperture of the fifth row 944, the second aperture of the first row 936 is aligned with the second aperture of the third row 940 and the second aperture of the fifth row 944, etc.). However, the corresponding apertures of the first row 936, the third row 940, and the fifth row 944 are offset along the length L relative to the corresponding apertures of the second row 938 and the fourth row 942 (i.e., the first apertures of the first, third, and fifth rows 936, 940, 944 are aligned lengthwise with the spaces between the first and second apertures of the second and fourth rows 938, 942).

Thus, the first distance $D_1$ and the fifth distance $D_5$ are substantially the same, and the second distance $D_2$ and the fourth distance $D_4$ are substantially the same, with the third distance $D_3$ being greater than the second distance $D_2$ and the fourth distance $D_4$, and with the second distance $D_2$ and the fourth distance $D_4$ being greater than the first distance $D_1$ and the fifth distance $D_5$. In this manner, the first group 924 takes on a substantially spire-shaped (or tapered) profile that is directed toward the center C from the near the first end 910.

The second group 926 includes a trio of apertures 906, namely an outer second aperture 946, an outer third aperture 948, and an outer fourth aperture 950. The outer second aperture 946 is aligned with the second row 938 of the first group 924, and is spaced apart from the second row 938 by an outer second gap 952 that is substantially twice the length of the equidistant spacing of the apertures 906 in the second row 938 (i.e., the outer second aperture 946 is essentially an extension of the second row 938 with an aperture 906 missing therebetween). Like the outer second aperture 946, the outer fourth aperture 950 is aligned with the fourth row 942 of the first group 924, and is spaced apart from the fourth row 942 by an outer fourth gap 954 that is substantially twice the length of the equidistant spacing of the apertures 906 in the fourth row 942 (i.e., the outer fourth aperture 950 is essentially an extension of the fourth row 942 with an aperture 906 missing therebetween). The outer third aperture 948 is similarly aligned with the third row 940 of the first group 924 but is (by contrast to the outer second aperture 946 and the outer fourth aperture 950) spaced apart from the third row 940 by an outer third gap 956 that is substantially the same length as the equidistant spacing of the apertures 906 in the third row 940 (i.e., the outer third aperture 948 is essentially an extension of the third row 940). In this manner, the second group 926 takes on a substantially arrowhead-shaped profile that is directed toward the first end 910.

Like the second group 926, the third group 928 includes a trio of apertures 906, namely an inner second aperture 958, an inner third aperture 960, and an inner fourth aperture 962. The inner second aperture 958 is aligned with the outer second aperture 946 and the second row 938 of the first group 924, and is spaced apart from the outer second aperture 946 by an inner second gap 964 that is substantially twice the length of the equidistant spacing of the apertures 906 in the second row 938 (i.e., the inner second aperture 958 is essentially an extension of the second row 938 with an aperture 906 missing between the inner second aperture 958 and the outer second aperture 946). Like the inner second aperture 958, the inner fourth aperture 962 is aligned with the outer fourth aperture 950 and the fourth row 942 of the first group 924, and is spaced apart from the outer fourth aperture 950 by an inner fourth gap 966 that is substantially twice the length of the equidistant spacing of the apertures 906 in the fourth row 942 (i.e., the inner fourth aperture 962 is essentially an extension of the fourth row 942 with an aperture 906 missing between the inner fourth aperture 962 and the outer fourth aperture 950). Unlike the outer third aperture 948, however, the inner third aperture 960 (while being similarly aligned with the third row 940 of the first group 924) is spaced apart from the outer third aperture 948 by an inner third gap 968 that is substantially twice the length of the equidistant spacing of the apertures 906 in the third row 940 (i.e., the inner third aperture 960 is essentially an extension of the third row 940 with an aperture 906 missing between the inner third aperture 960 and the outer third aperture 948). In this manner, the third group 928 takes on a substantially arrowhead-shaped profile that is directed toward the first end 910. With the arrangement of apertures 906 in the illustrated embodiment, the overall pattern of apertures 906 (i.e., the first group 924, the second group 926, and the third group 928, collectively) between the first end 910 and the center C tapers toward the center C from the near the first end 910.

Notably, the sixth group 934, the fifth group 932, and the fourth group 930 have apertures 906 arranged relative to one another (and relative to the second end 912) in a manner that substantially mirrors the arrangement of the apertures 906 of the first group 924, the second group 926, and the third group 928, respectively, relative to one another (and relative to the first end 910). In other words, the arrangement of apertures 906 between the second end 912 and the center C is substantially a reflection (about the center C) of the arrangement of apertures 906 between the first end 910 and the center C. As such, if the length L of the lower heat distribution member 904 is segmented into sixths (i.e., a first segment 970, a second segment 972, a third segment 974, a fourth segment 976, a fifth segment 978, and a sixth segment 980 that are of equal lengths and are ordered sequentially from the first end 910 to the second end 912), it can be seen that the inner third of the lower heat distribution member 904 (i.e., the third segment 974 and the fourth segment 976 collectively) has less open space than the intermediate third (i.e., the second segment 972 and the fifth segment 978 collectively), which has less open space than the outer third (i.e., the first segment 970 and the sixth segment 980 collectively). With each aperture having its own respective area (e.g., $\pi r^2$ for the circular apertures 906 of the illustrated embodiment), the term "open space" as used herein refers to the sum of the areas of the apertures that are disposed on a given segment(s) of the heat distribution member.

In alternative embodiments, to facilitate enabling the lower heat distribution member 904 to function as described herein, the lower heat distribution member 904 may have any suitable contour (e.g., may be unbent like the lower heat distribution member 404, or generally semi-cylindrical like the upper heat distribution member 804). Additionally, the lower heat distribution member 904 may have any suitable number of apertures 906, and each of the apertures 906 may have any suitable shape (e.g., the apertures 906 may alternatively be oblong, or shaped as squares, rectangles, or triangles). Moreover, the apertures 906 may be arranged in any suitable manner that facilitates enabling the lower heat distribution member 904 to function as described herein (e.g., the apertures 906 may be curvilinearly or somewhat randomly arranged rather than being arranged in rows).

In accordance with the above-described temperature variations along the heating element 908 and the above-described pattern of apertures 906 in the lower heat distribution member 904, the lower heat distribution member 904 serves to more evenly distribute (e.g., deflect and/or diffract) heat waves emitted from the heating element 908 of the lower heating device 902 onto the food product, thereby facilitating a more even distribution of heat incidence from the heating element 908 over the food product.

Provided in FIGS. 22(a)-22(c) is a table 981 of estimated data quantifying the relationship between the heating element 908 and the lower heat distribution member 904 set forth above. Notably, the "length" column is indicative of the length (in inches) of either the heating element 908 or the lower heat distribution member 904 (being that both have substantially the same overall length L), and the "energy output" column is indicative of energy emitted from the heating element 908 (in watts). Moreover, the "open area/total area ratio" column is indicative of the ratio of open space (as defined above) to total area (length×width) of a lengthwise segment of the lower heat distribution member 904, and the "energy to food product" column is indicative of the energy (in watts) that is emitted directly onto the food product from the heating element 908 via apertures 906 in the lower heat distribution member 904.

FIG. 23 is a graphical representation of the estimated data from the table 981 of FIGS. 22(a)-22(c). Notably, the graph 982 has an x-axis 984 and a pair of y-axes 986, 988. The first y-axis 986 represents the energy output parameter (in watts) of the heating element 908, and the second y-axis 988 represents the open area/total area ratio parameter of the lower heat distribution member 904. The x-axis 984 represents the length parameter that, on the one hand, corresponds to the length L of the lower heat distribution member 904 (when used in conjunction with the second y-axis 988), and on the other hand corresponds to the length L of the heating element 908 (when used in conjunction with the first y-axis 986). In this manner, the graph 982 of FIG. 23 enables simultaneously illustrating the relationship between: (1) the variation in energy output of the heating element 908 along its length L; and (2) the variation in open area/total area ratio of the lower heat distribution member 904 along its length L.

Notably, as can be seen in the graph 982, the energy output (and, therefore, the associated temperature) of the heating element 908 varies continuously along the length L of the heating element 908. More specifically, the energy output increases continuously from the first end $E_1$ of the heating element 908 (i.e., at 0 inches) to the center C of the heating element 908 (i.e., at 5.5 inches), and then decreases continuously from the center C of the heating element 908 (i.e., at 5.5 inches) to the second end $E_2$ of the heating element 908 (i.e., at 11 inches). As illustrated by the graph 982 of FIG. 23, this variation in energy output (indicated on the first y-axis 986) along the length L of the heating element 908 (indicated on the x-axis 984) and, therefore, the variation in the associated temperature along the length L of the heating element 908 takes on a substantially parabolic curve 990.

Due to the substantially mirrored grouping of apertures 906 described above, the open area/total area ratio varies along the length L of the lower heat distribution member 904. More specifically, the ratio taken along the first segment 970 (from 0 inches to 1.9 inches) is greater than the ratio taken along the second segment 972 (from 2.0 inches to 3.3. inches), which is greater than the ratio taken along the combination of the third and fourth segments 974, 976 (from 3.4 inches to 7.6 inches), which is less than the ratio taken along the fifth segment 978 (from 7.7 inches to 9 inches), which is less than the ratio taken along the sixth segment 980 (from 9.1 inches to 11 inches). As illustrated by the graph 982 of FIG. 23, this ratio variation along the length L of the lower heat distribution member 904 therefore takes on a generally stepwise profile 992.

Notably, the stepwise profile 992 has an associated curve 994 of interpolated ratio data points. Because the stepwise profile 992 of the ratio parameter defines at least three steps (e.g., a first step 996, a second step 998, and a third step 999) on each side of the center of the length parameter (which is at about 5.5 inches on the x-axis 984), the generally parabolic interpolated ratio curve 994 has a slope (on each side of the length center) that is closer to varying inversely proportionately to the variation in slope (on each side of length center) of the generally parabolic energy output curve 990. Simply put, the apertures 906 have been arranged such that the variation in open space along the lower heat distribution member 904 transitions more smoothly (and gradually) from the center C outward to the ends 910, 912, thereby having a closer to inverse relationship to the smooth (and gradual) variation in temperature along the length L of the heating element 908. This facilitates better mitigation of an uneven distribution of heat incidence over the food product that could have otherwise resulted from the temperature variation along the heating element 407, thereby enabling more even heating along the food product (e.g., more even toasting of bread).

When introducing elements of the present invention or the preferred embodiment(s) thereof, the articles "a", "an", "the", and "said" are intended to mean that there are one or more of the elements. The terms "comprising", "including", and "having" are intended to be inclusive and mean that there may be additional elements other than the listed elements.

As various changes could be made in the above constructions without departing from the scope of the invention, it is intended that all matter contained in the above description or shown in the accompanying drawings shall be interpreted as illustrative and not in a limiting sense.

What is claimed is:

1. A heating appliance comprising:
  a housing defining a food product compartment;
  a rack for supporting a food product within the food product compartment; and
  a heating assembly comprising:
    an infrared heating element having a length, wherein the heating element has a lengthwise temperature variation along its length when heated so as to emit radiant energy unevenly along its length and including at least a first portion that emits greater heat energy than a second portion; and
    a heat distribution member having a length and disposed between the heating element and the rack, wherein the heat distribution member is positioned adjacent the first and second portions of the heating element and comprises an arrangement of apertures over at least a portion of its length, the arrangement of the apertures providing an open area ratio that also varies along the length of the heat distribution member adjacent to the first and second heating element portions and in accordance with the temperature variation of the heating element, the open area ratio of a portion of the heat distribution member adjacent and opposed to the second portion of the heating element being greater than the open area ratio of another portion of the heat distribution member adjacent and opposed to the first heating element portion for reducing an uneven distribution of emitted heat,
    wherein the heating element and the heat distribution member are disposed within the food product compartment such that infrared energy emitted by the heating element is distributed onto the food product by the heat distribution member.

2. The heating appliance of claim 1, wherein the heating element when heated has a lengthwise temperature decrease adjacent the temperature increase, the arrangement of apertures increasing the open area ratio in accordance with the temperature decrease.

3. The heating appliance of claim 1, wherein the heating element has a first end and a second end such that the length extends from the first end to the second end and such that the length has a center between the first end and the second end, wherein a temperature increases lengthwise from the first end toward the center-when the heating element is heated, the open area ratio decreasing with the temperature increase from the first end toward the center.

4. The heating appliance of claim 3, wherein the temperature increases lengthwise from the second end toward the center, the open area ratio decreasing with the temperature increase from the second end toward the center.

5. The heating appliance of claim 4, wherein the lengthwise temperature increase from the first end toward the center is substantially the same as the lengthwise temperature increase from the second end toward the center, the open area ratio substantially mirroring the second taper of the profile.

6. The heating appliance of claim 1, wherein the apertures are arranged in a plurality of distinct groups.

7. The heating appliance of claim 6, wherein the groups are distinct via spacing from one another.

8. The heating appliance of claim 6, wherein the apertures of at least two of the groups are arranged differently by comparison.

9. The heating appliance of claim 6, wherein the apertures of each group are arranged in rows, the rows being common amongst the groups.

10. A heating appliance comprising:
  a housing defining a food product compartment;
  a rack for supporting a food product within the food product compartment; and
  a heating assembly disposed within the food product compartment, the heating assembly comprising:
    a heating element having a first end, a second end, and a length having a center between the first end and the second end, wherein the heating element has a temperature that varies lengthwise between the first end and the second end when heated so as to emit radiant energy unevenly along its length, such that the temperature increases lengthwise from the first end toward the center and increases lengthwise from the second end toward the center-such that the heating element is hottest near the center; and
    a heat distribution member having and length and disposed between the heating element and the rack, wherein the heat distribution member comprises:
      a first end adjacent the first end of the heating element;
      a second end adjacent the second end of the heating element;
      a center between the first and second ends of the heat distribution member positioned adjacent to the center of the heating element; and
      an arrangement of apertures, wherein the arrangement of the apertures provides an open area ratio that varies along at least a portion of a length of the heat distribution member from the first end of the heat distribution member toward the center of the heat distribution member and also varies along at least another portion of a length of the heat distribution member from the second end of the heat distribution member toward the center of the heat distribution member in accordance with the lengthwise temperature increases of the heating element, the open area ratio of the first and second ends of the heat distribution member adjacent the first and second ends of the heating element being greater than the open area ratio of the center of the heat distribution member adjacent the center of the heating element for reducing an uneven distribution of emitted heat along the heat distribution member, wherein the arrangement comprises a first plurality of distinct groups of apertures disposed between the first end of the heat distribution member and the center of the heat distribution member that substantially mirrors a second plurality of distinct groups of apertures between the second end of the heat distribution member and the center of the heat distribution member.

\* \* \* \* \*